(12) United States Patent
Shibata et al.

(10) Patent No.: US 9,594,442 B2
(45) Date of Patent: Mar. 14, 2017

(54) HANDWRITING INPUT DEVICE, METHOD FOR OBTAINING HANDWRITING INFORMATION, AND NON-TRANSITORY COMPUTER-READABLE STORAGE MEDIUM

(71) Applicant: Konica Minolta, Inc., Tokyo (JP)

(72) Inventors: Tetsuhiro Shibata, Hamamatsu (JP); Keiichiro Hyodo, Kokubunji (JP); Masayuki Inoue, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/836,479

(22) Filed: Aug. 26, 2015

(65) Prior Publication Data

US 2016/0062491 A1    Mar. 3, 2016

(30) Foreign Application Priority Data

Sep. 3, 2014 (JP) ................................. 2014-178661

(51) Int. Cl.
   *G06F 3/041* (2006.01)
   *G06F 3/0354* (2013.01)
   (Continued)

(52) U.S. Cl.
   CPC .......... *G06F 3/03545* (2013.01); *G06F 3/038* (2013.01); *G06F 3/03547* (2013.01);
   (Continued)

(58) Field of Classification Search
   None
   See application file for complete search history.

(56) References Cited

U.S. PATENT DOCUMENTS

2002/0067854 A1* 6/2002 Reintjes ................ G06F 3/0488
                                                        382/199
2006/0138228 A1   6/2006 Sanders et al.
(Continued)

FOREIGN PATENT DOCUMENTS

JP    2004046637 A    2/2004
JP    2010271830 A   12/2010
(Continued)

OTHER PUBLICATIONS

Extended European Search Report dated Feb. 1, 2016; Application No./Patent No. 15183172.4-1972 ; Applicant: Konica Minolta, Inc.; total of 9 pages.

*Primary Examiner* — Ilana Spar
*Assistant Examiner* — Kirk Hermann
(74) *Attorney, Agent, or Firm* — Lucas & Mercanti, LLP

(57) ABSTRACT

A handwriting input device includes: a touch panel which can detect a touch given through a sheet of paper; and a control section. The control section obtains position information of a touch point on the touch panel at first time intervals, and determines a location of a sheet on the touch panel to obtain sheet location information, at second time intervals. The control section outputs the position information of the touch points and the corresponding sheet location information. The control section optionally calculates displacement amounts of the sheet on the basis of a change of the sheet location information, and outputs the position information of the touch points and the corresponding displacement amounts of the sheet. The control section optionally corrects the position information of the touch points on the basis of the displacement amounts of the sheet.

19 Claims, 28 Drawing Sheets

(51) Int. Cl.
*G06F 3/046* (2006.01)
*G06F 3/0488* (2013.01)
*G06F 3/038* (2013.01)

(52) U.S. Cl.
CPC ............ *G06F 3/046* (2013.01); *G06F 3/0414* (2013.01); *G06F 3/0416* (2013.01); *G06F 3/0488* (2013.01); *G06F 3/04883* (2013.01)

(56) References Cited

U.S. PATENT DOCUMENTS

| | | |
|---|---|---|
| 2013/0009911 A1 | 1/2013 | Shibata et al. |
| 2014/0035840 A1 | 2/2014 | Guerin |
| 2014/0044357 A1* | 2/2014 | Moorthy ............... G06F 17/243 382/188 |
| 2015/0277583 A1 | 10/2015 | Kasahara et al. |

FOREIGN PATENT DOCUMENTS

| | | |
|---|---|---|
| JP | 2013033444 A | 2/2013 |
| WO | 2011151604 A2 | 12/2011 |
| WO | 20140073346 A1 | 5/2014 |

* cited by examiner

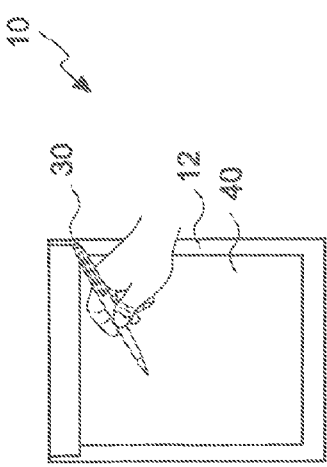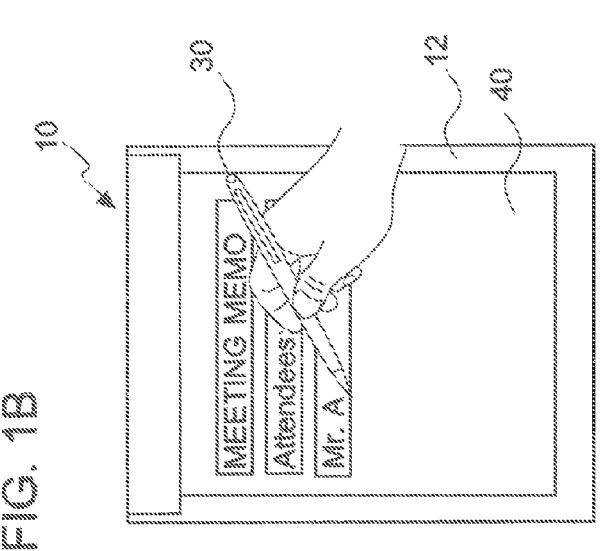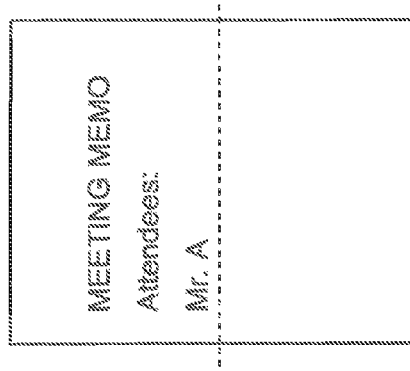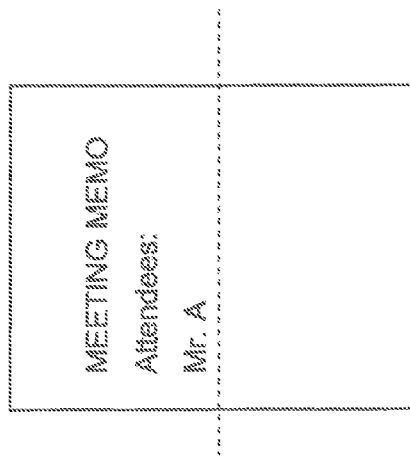
FIG. 1A
FIG. 1B
FIG. 1C
RELATED ART
FIG. 1D

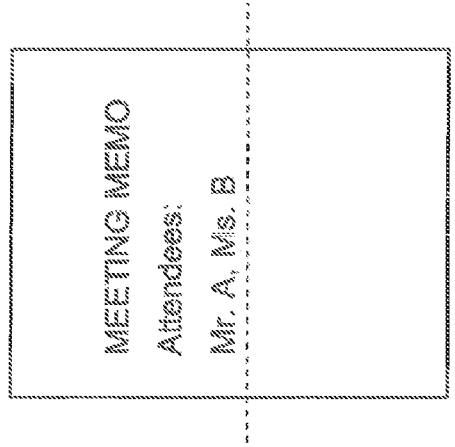
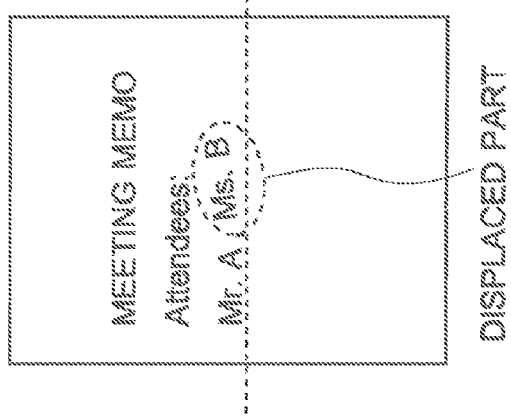
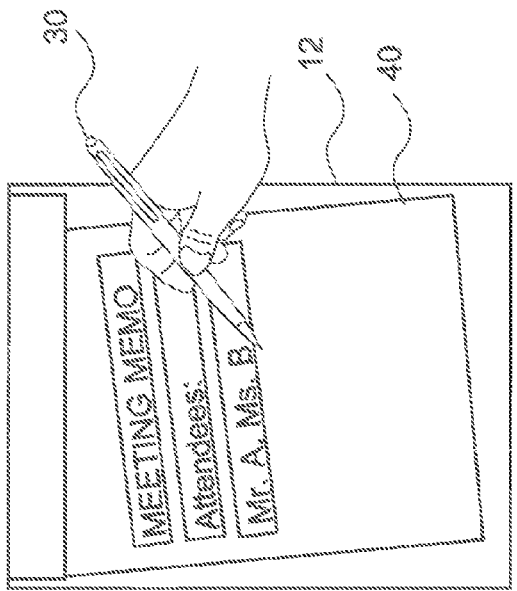

FIG. 20

| | | Handwriting Information | | | | | Sheet location information | | | |
|---|---|---|---|---|---|---|---|---|---|---|
| | ID | X | Y | Pen event | Time | Line seg. flag | Time | Init. point | Term. point | |
| *1 | 1 | 50 | 50 | Pen Down | 155 | Straight | 155 | 0, 0 | 100, 0 | A |
| | 1 | 51 | 51 | Move | 156 | Straight | 156 | 0, 0 | 100, 0 | |
| | 1 | 52 | 52 | Move | 157 | Straight | 157 | 0, 0 | 100, 0 | |
| | 1 | 53 | 53 | Move | 158 | Straight | 158 | 0, 0 | 100, 0 | |
| | 1 | 54 | 54 | Move | 159 | Straight | 159 | 0, 0 | 100, 0 | |
| | 1 | 55 | 55 | Pen Up | 160 | Straight | 160 | 0, 0 | 100, 0 | |
| *2 | 0 | 54 | 58 | None | 163 | Straight | 163 | 0, 0 | 100, 1 | B |
| | 0 | 52 | 61 | None | 164 | Straight | 164 | 0, 0 | 100, 2 | |
| | 0 | 51 | 64 | None | 165 | Straight | 165 | 0, 0 | 100, 3 | |
| | 0 | 49 | 67 | None | 166 | Straight | 166 | 0, 0 | 99, 4 | |
| | 0 | 48 | 70 | None | 167 | Straight | 167 | 0, 0 | 99, 5 | |
| | 0 | 46 | 73 | None | 168 | Straight | 168 | 0, 0 | 99, 6 | |
| | 0 | 45 | 75 | None | 169 | Straight | 169 | 0, 0 | 98, 7 | |
| *1 | 2 | 45 | 75 | Pen Down | 175 | Curve | 175 | 0, 0 | 98, 7 | C |
| | 2 | 44 | 73 | Move | 176 | Curve | 176 | 0, 0 | 98, 7 | |
| | 2 | 44 | 72 | Move | 177 | Curve | 177 | 0, 0 | 98, 7 | |
| | 2 | 43 | 70 | Move | 178 | Curve | 178 | 0, 0 | 98, 7 | |
| | 2 | 43 | 69 | Move | 179 | Curve | 179 | 0, 0 | 98, 7 | |
| | 2 | 42 | 67 | Move | 180 | Curve | 180 | 0, 0 | 98, 7 | |
| | 2 | 42 | 65 | Move | 181 | Curve | 181 | 0, 0 | 98, 7 | |
| | 2 | 42 | 63 | Move | 182 | Curve | 182 | 0, 0 | 98, 7 | |
| | 2 | 43 | 61 | Move | 183 | Curve | 183 | 0, 0 | 98, 6 | |
| | 2 | 43 | 60 | Move | 184 | Curve | 184 | 0, 0 | 98, 6 | |
| | 2 | 44 | 58 | Move | 185 | Curve | 185 | 0, 0 | 98, 5 | |
| | 2 | 45 | 56 | Move | 186 | Curve | 186 | 0, 0 | 98, 5 | |
| | 2 | 45 | 56 | Move | 190 | Curve | 190 | 0, 0 | 99, 4 | |
| | 2 | 46 | 55 | Move | 191 | Straight | 191 | 0, 0 | 99, 4 | |
| | 2 | 47 | 54 | Move | 193 | Straight | 193 | 0, 0 | 99, 3 | |
| | 2 | 49 | 53 | Move | 195 | Straight | 195 | 0, 0 | 99, 2 | |
| | 2 | 50 | 52 | Move | 197 | Straight | 197 | 0, 0 | 99, 1 | |
| | 2 | 51 | 51 | Pen Up | 199 | Straight | 199 | 0, 0 | 100, 0 | |

*1 Draw with a pen
*2 Move a user's hand

FIG. 32A

| ET *3 | *4 | *5 | ID | X | Y | Pen event | Time | Line seg. flag | Time | Init. point | Term. point | Sheet change flag |
|---|---|---|---|---|---|---|---|---|---|---|---|---|
| | | | | | | Handwriting information | | | Sheet location information | | | |
| 0 | Start | Start | 1 | 50 | 50 | Pen Down | 155 | Straight | 155 | 0, 0 | 100, 0 | Straight |
| 10 | | | | | | | | | | | | |
| 20 | Start | | 1 | 51 | 51 | Move | 157 | Straight | | | | |
| 30 | | Start | | | | | | | | | | |
| 40 | Start | | 1 | 52 | 52 | Move | 159 | Straight | 158 | 0, 0 | 100, 0 | Straight |
| 50 | | | | | | | | | | | | |
| 60 | Start | Start | 1 | 53 | 53 | Move | 161 | Straight | 161 | 0, 0 | 100, 0 | Straight |
| 70 | | | | | | | | | | | | |
| 80 | Start | | 1 | 54 | 54 | Move | 163 | Straight | | | | |
| 90 | | Start | | | | | | | | | | |
| 100 | Start | | 1 | 55 | 55 | Pen Up | 165 | Straight | 164 | 0, 0 | 100, 0 | Straight |
| 110 | | | | | | | | | | | | |
| 120 | Start | Start | 0 | 54 | 58 | None | 167 | Straight | 167 | 0, 0 | 100, 1 | Straight |
| 130 | | | | | | | | | | | | |
| 140 | Start | | 0 | 52 | 61 | None | 169 | Straight | | | | |
| 150 | | Start | | | | | | | | | | |
| 160 | Start | | 0 | 51 | 64 | None | 171 | Straight | 170 | 0, 0 | 100, 2 | Straight |
| 170 | | | | | | | | | | | | |
| 180 | Start | Start | 0 | 49 | 67 | None | 173 | Straight | 173 | 0, 0 | 99, 4 | Curve |
| 190 | | | | | | | | | | | | |
| 200 | Start | | 0 | 48 | 70 | None | 175 | Straight | | | | |

*1 Draw with a pen
*2 Move a user's hand
*3 Elapsed time
*4 Start of the task of FIG. 13
*5 Start of the task of FIG. 14

FIG. 32B

| ET *3 | *4 | *5 | Handwriting information | | | | | | Sheet location information | | | |
|---|---|---|---|---|---|---|---|---|---|---|---|---|
| | | | ID | X | Y | Pen event | Time | Line seg. flag | Time | Init. point | Term. point | Sheet change flag |
| 210 | Start | | | | | | | | | | | |
| 220 | | Start | 0 | 46 | 73 | None | 177 | Straight | 176 | 0.0 | 99.5 | Straight |
| 230 | | | | | | | | | | | | |
| 240 | Start | Start | 0 | 46 | 75 | None | 179 | Straight | 179 | 0.0 | 98.7 | Straight |
| 250 | | | | | | | | | | | | |
| 260 | | Start | 2 | 45 | 75 | Pen Down | 180 | Curve | | | | |
| 270 | | | | | | | | | | | | |
| 280 | | Start | 2 | 44 | 73 | Move | 182 | Curve | 181 | 0.0 | 98.7 | Straight |
| 290 | | | | | | | | | | | | |
| 300 | Start | Start | 2 | 44 | 72 | Move | 184 | Curve | 184 | 0.0 | 98.7 | Straight |
| 310 | | | | | | | | | | | | |
| 320 | | Start | 2 | 43 | 70 | Move | 186 | Curve | | | | |
| 330 | | | | | | | | | | | | |
| 340 | Start | Start | 2 | 43 | 69 | Move | 188 | Curve | 187 | 0.0 | 98.7 | Straight |
| 350 | | | | | | | | | | | | |
| 360 | | Start | 2 | 42 | 67 | Move | 190 | Curve | 190 | 0.0 | 98.7 | Straight |
| 370 | | | | | | | | | | | | |
| 380 | Start | Start | 2 | 42 | 65 | Move | 192 | Curve | | | | |
| 390 | | | | | | | | | | | | |
| 400 | Start | | 2 | 42 | 63 | Move | 194 | Curve | 193 | 0.0 | 98.7 | Straight |

*1 Draw with a pen
*2 Move a user's hand
*3 Elapsed time
*4 Start of the task of FIG. 13
*5 Start of the task of FIG. 14

FIG. 32C

| ET *3 | *4 | *5 | ID | X | Y | Pen event | Time | Line seg. flag | Time | Init. point | Term. point | Sheet change flag |
|---|---|---|---|---|---|---|---|---|---|---|---|---|
| 410 | | | | | | | | | | | | |
| 420 | Start | Start | 2 | 43 | 61 | Move | 196 | Curve | 196 | 0.0 | 98.6 | Straight |
| 430 | | | | | | | | | | | | |
| 440 | | Start | 2 | 43 | 60 | Move | 198 | Curve | | | | |
| 450 | Start | | | | | | | | | | | |
| 460 | | Start | 2 | 44 | 58 | Move | 200 | Curve | 199 | 0.0 | 98.6 | Straight |
| 470 | | | | | | | | | | | | |
| 480 | Start | Start | 2 | 46 | 56 | Move | 202 | Curve | 202 | 0.0 | 98.5 | Straight |
| 490 | | | | | | | | | | | | |
| 500 | Start | | 2 | 45 | 56 | Move | 204 | Curve | | | | |
| 510 | | Start | | | | | | | 205 | 0.0 | 89.4 | Straight |
| 520 | Start | | 2 | 46 | 55 | Move | 206 | Straight | | | | |
| 530 | | Start | | | | | | | | | | |
| 540 | Start | | 2 | 47 | 54 | Move | 208 | Straight | 208 | 0.0 | 89.3 | Straight |
| 550 | | Start | | | | | | | | | | |
| 560 | Start | | 2 | 49 | 53 | Move | 210 | Straight | 211 | 0.0 | 89.2 | Straight |
| 570 | | Start | | | | | | | | | | |
| 580 | Start | | 2 | 50 | 52 | Move | 212 | Straight | | | | |
| 590 | | Start | | | | | | | | | | |
| 600 | Start | | 2 | 51 | 51 | Pen Up | 214 | Straight | 214 | 0.0 | 100.0 | Curve |

*1 Draw with a pen
*3 Elapsed time
*4 Start of the task of FIG. 13
*5 Start of the task of FIG. 14

HANDWRITING INPUT DEVICE, METHOD FOR OBTAINING HANDWRITING INFORMATION, AND NON-TRANSITORY COMPUTER-READABLE STORAGE MEDIUM

The entire disclosure of Japanese Patent Application No. 2014-178661 filed on Sep. 3, 2014 including description, claims, drawings, and abstract are incorporated herein by reference is its entirety.

TECHNICAL FIELD

The present invention relates to a handwriting input device, a method for obtaining handwriting information, and a non-transitory computer-readable storage medium storing a handwriting information obtaining program. In particular, the present invention relates to a handwriting input device which can convert information written by hand on a sheet of paper into electronic data and then output the electronic data; a handwriting information obtaining method which enables to obtain handwriting information corrected in accordance with a displacement of a sheet caused daring a user is conducting a handwriting input on the sheet; and a non-transitory computer-readable storage medium storing a handwriting information obtaining program for executing such a method.

BACKGROUND

In recent years, handwriting input devices are being on the market, and such a handwriting input device is equipped with a function which allows a user to input information including characters and figures by handwriting on a sheet of paper and saves or outputs the information including characters and figures input by handwriting (hereafter, referred to as handwriting information) as electronic data (hereinafter, referred to as handwriting data). The handwriting input device includes a touch panel of a pressure sensitive type, as electromagnetic induction type, or a magnetic detection type. In response to a handwriting input made with a pen on a sheet of paper placed on the touch panel, the touch panel can detect a touch gives with the pen, and save or output a movement trail of a touch point as handwriting data.

DESCRIPTION OF THE RELATED ART

Such a handwriting input device holds a sheet of paper thereon with a clip or the like. In the handwriting input device, a great pen pressure or a movement of a user's hand put on the sheet may cause a displacement of the sheet during a user is conducting a handwriting input. A succeeding handwriting input on the sheet displaced from a proper position, can make a difference between the coordinates of a touch position on the sheet and the coordinates of the touch position detected by a touch panel. Accordingly, the handwriting input device may output electronic data representing information in a different pattern from the handwriting information actually written on the sheet. Under such a circumstance, various methods have been proposed so as to detect a displacement of a sheet on the device and then correct handwriting information.

For example, Japanese Unexamined Patent Publication (JP-A) No. 2004-046637 discloses a writing input device to input writing strokes made on a printed document as data of coordinates. The printed document includes plural codes inclined at a predetermined angle on a sheet surface of the printed document. The writing input device includes a first rail, a driven section, a second rail, a code reading section, and a coordinate correcting section. The writing input device has a surface on which the printed document is placed, and the first rail is arranged horizontally across the surface and extends in parallel to a side of the surface. The driven section is movable on the first rail. The second rail is fixed to the driven section so as to have a positional relationship to be perpendicular to the first rail. The code reading section is movable on the second rail and can read the codes on the printed document. The coordinate correcting section can recognize a difference in coordinates between a reference electronic document and the printed document, and corrects the difference. When the printed document is placed on the writing input device, the code reading section reads the plural codes, and the inclination of the printed, document is corrected on the basis of the inclination of the codes read by the code reading section.

Further, JP-A No. 2010-271830 discloses a handwriting stroke reading device including a reading section on which a sheet of paper is placed. The reading section outputs electric signals corresponding to user's writing onto the sheet. The handwriting stroke reading device detects handwriting strokes made by the user on the sheet placed on the reading section, on the basis of the electric signals output from the reading section. The handwriting stroke reading device further includes a control section to control the operation of the handwriting stroke reading device, a sheet locking section, and a lock state detecting section. The sheet locking section alternatively enters any one of a lock state and a unlock state by a user's operation, where the lock state is capable of holding a sheet placed on the reading section and the unlock state is incapable of holding a sheet placed on the reading section. The lock state detecting section detects the sheet locking section being which one of the lock state and the unlock state and outputs a detection signal which indicates the sheet locking section being which one of the lock state and the unlock state. The control section judges the state of the sheet locking section on the basis of the detection signal output from the lock state detecting section. If the sheet locking section is in the lock state, the control section executes handwriting-stroke detection processing so as to detect handwriting strokes made by the user on the sheet placed on the reading device and to record data of the handwriting strokes.

Furthermore, JP-A No. 2013-033444 (corresponding to US2013/0009911A1) discloses an input device equipped with an underlay board. The input device includes a frame-shaped plate in which a space surrounded with a frame forms a hollow section for input, a light-emitting section provided on one of facing parts of the frame-shaped plate, and a light-receiving section provided on the other of the facing parts of the frame-shaped plate so as to receive light beams emitted from the light-emitting section. The underlay board is pivotably mounted onto the back surface of the input device about one edge of the input device. The underlay board includes a positioning section for positioning a writing sheet on the frost surface of the underlay board. The front surface of the underlay board and the back surface of the input device are configured to form a holding part for holding the writing sheet between them.

The above-mentioned JP-A No. 2004-046637 discloses a technique to detect a displacement amount of a sheet at the time of setting the sheet on the device first and then correct handwriting information uniformly. This method hardly corrects handwriting information properly, if a sheet is displaced in the middle of a user's handwriting input.

Further, this method needs an arrangement of the first rail, the second rail, the code reading section, etc. in the writing input device. This makes the constitution of the device and the control complicated. In addition, this method needs a use of a sheet on which multiple codes are written in beforehand, and has a problem of less versatility.

The above-mentioned JP-A No. 2010-271830 discloses a technique to prohibit handwriting until a sheet is securely pressed down by the sheet locking section. This has a possibility of displacement of a sheet in the case where a lock is insufficient, and handwriting information is hardly corrected properly under the condition that the sheet has been displaced. Further, this method also needs an arrangement of the sheet locking section, the lock state detecting section, and the like in the handwriting strokes reading device, which makes the constitution of the device and the control complicated, and arises a problem of less versatility.

The above-mentioned JP-A No. 2013-033444 (corresponding to US2013/0009911A1) discloses a technique to make a sheet not to incline by using an underlay board with the special constitution. This method also needs an arrangement of the underlay board with the special constitution, which makes the constitution of the device and the control complicated, and arises a problem of less versatility.

The present invention seeks to solve the above problems.

SUMMARY

The present invention has been achieved in view of the above-mentioned problems, and an object of the present invention is to provide a handwriting input device, a method for obtaining handwriting information, and a non-transitory computer-readable storage medium storing a handwriting information obtaining program, which allow a user to obtain handwriting information corrected appropriately in a simple manner even in the case where a sheet on the handwriting input device has been displaced in the middle of user's handwriting input.

There are disclosed illustrative handwriting input devices, illustrative methods for obtaining handwriting information, and non-transitory computer-readable storage media each storing a handwriting information obtaining program, according to embodiments of the present invention.

An illustrative handwriting input device reflecting one aspect of the present invention is a handwriting input device comprising: a touch panel which can detect a touch given through a sheet of paper put on the touch panel; and a control section. The control section obtains position information of a touch point on the touch panel at first time intervals, and determines a location of a sheet of paper on the touch panel to obtain position information of a specific part of the sheet as sheet location information, at second time intervals. The control section further outputs the position information of the touch points and the sheet location information so as to be associated with each other.

As illustrative method for obtaining handwriting information reflecting one aspect of the present invention is a method for obtaining handwriting information in a system including a handwriting input device. The handwriting input device includes a touch panel which can detect a touch given through a sheet of paper put on the touch panel. The illustrative method comprises: obtaining position information of a touch point on the touch panel at first time intervals; determining a location of a sheet of paper on the touch panel to obtain position information of a specific part of the sheet as sheet location information, at second time intervals; and outputting the position information of the touch points and the sheet location information so as to be associated with each other.

An illustrative non-transitory computer-readable storage medium reflecting one aspect of the present invention stores a handwriting information obtaining program to be executed in a handwriting input device. The handwriting input device include a touch panel which can detect a touch given through a sheet of paper put on the touch panel. The handwriting information obtaining program, when being executed by a processor of the handwriting input device, causes the handwriting input device to perform the following processing. The processing comprises: obtaining position information of a touch point on the touch panel at first time intervals; determining a location of a sheet of paper on the touch panel to obtain position information of a specific part of the sheet as sheet location information, at second time intervals; and outputting the position information of the touch points and the sheet location information so as to be associated with each other.

Other features of illustrative embodiments will be described below.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIGS. 1A to 1J are diagrams for comparing electronic data obtained by a conventional handwriting input device and electronic data obtained by a handwriting input device according to one embodiment of the present invention;

FIG. 20 illustrates an example of a table showing handwriting information and sheet location information according to one embodiment of the present invention;

FIGS. 32A to 32C illustrate another example of a table showing handwriting information and sheet location information according to one embodiment of the present invention.

DESCRIPTION OF THE PREFERRED EMBODIMENTS

Hereinafter, an embodiment of the present invention will be described with reference to the drawings. However, the scope of the invention is not limited to the illustrated examples.

As given in the description of the related art, in a handwriting input device which allows a user to perform handwriting input on a sheet of paper put on a touch panel, the sheet is held with a holding part like a clip. In such a handwriting input device, a strong friction given to the sheet by a pen or a user's hand may cause displacement of the sheet from a proper position during user's handwriting input. A succeeding input performed on the sheet displaced from the proper position, can make irregular difference between the coordinates of a touch position on the sheet and the coordinates of the touch position detected by a touch panel, which results in that the handwriting input device outputs information of a pattern different from the handwriting information actually made on the sheet. Here, the term "irregular" means that the position and angle of a sheet relative to a touch panel change irregularly or indeterminately during a user's handwriting input. For example, the term "irregular" means the following situation. At first, a sheet of paper is placed at a proper position on the device. After ten minutes have elapsed, the sheet has inclined by 20 degrees. After another ten minutes have elapsed, the sheet has inclined by 25 degrees.

Figure 1H:
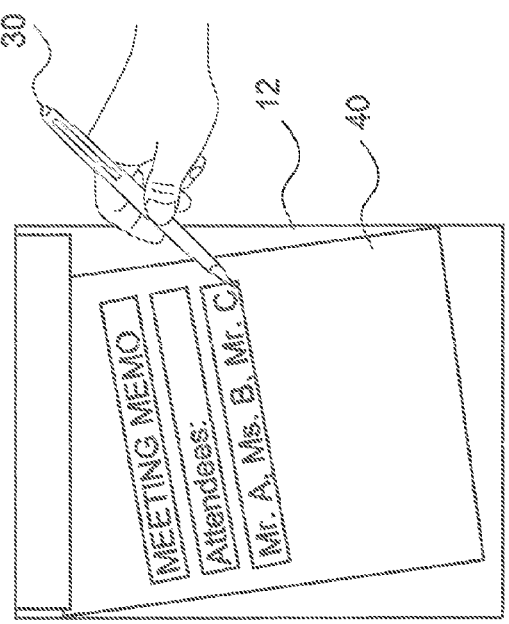
Figure 1I:
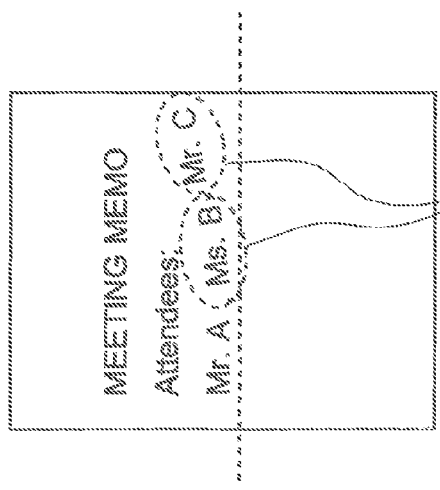
Figure 1J:
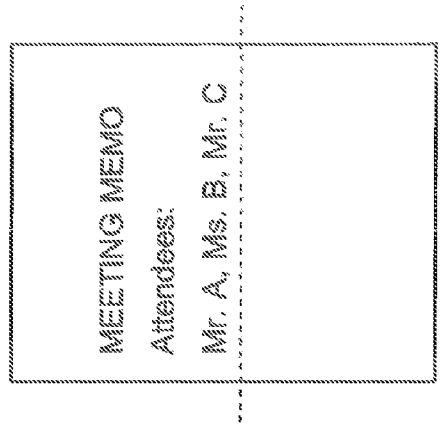

Description is given to the above problems concretely with reference to FIGS. 1A to 1J. Consideration is given to a case where, as illustrated in FIG. 1A, sheet 40 of paper is placed at a proper position on touch panel 12 of handwriting input device 10 and a user performs handwriting input with pen 30. Each of FIGS. 1B, 1E and 1H illustrates the handwriting input device 10 and sheet 40 placed thereon, and FIGS. 1C, 1F and 1I illustrate handwriting data (electronic data) outputted by the touch panel 12 by using a conventional technique under the condition that the sheet 40 changes in angle during the handwriting input as illustrated in FIGS. 1B, 1E and 1H, respectively. As illustrated in FIG. 1B, in the case where certain words (here, "MEETING MEMO Attendees: Mr. A") are input by a user on sheet 40 placed, at a proper position, electronic data (see FIG. 1C) output from touch panel 12 coincide with the handwriting information actually input by the user. Subsequently, as illustrated in FIG. 1E, it is assumed that after tire sheet 40 has moved (here, has turned counter clockwise) together with the movement of pen 30 or a user's hand which comes in contact with the sheet 40, the user further inputs additional words (here, "Ms. B"). In this case, as illustrated in FIG. 1E, the user fills a form prepared on the sheet on the device, which does not make displacement of the words with respect to the sheet but causes touch panel 12 to determine that the second-input words have been input at a position different from the actual position of the second-input words on the sheet. As a result, as illustrated in FIG. 1F, the touch panel 12 outputs electronic data in which the second-input words are tilted relative to the first-input words (see the displaced part of FIG. 1F). Similarly, as illustrated in FIG. 1H, it is assumed that after the sheet 40 has turned more together with the movement of the pen 30 or the user's hand which comes in contact with the sheet 40, the user further inputs additional words (here, "Mr. C"). Also in this case, as illustrated in FIG. 1H, it does not make displacement of the words with respect to the sheet but causes touch panel 12 to determine that the third-input words have been input at a position different from the actual position of the third-input words on the sheet. As a result, as illustrated in FIG. 1I, the touch panel 12 outputs electronic data in which the third-input words are further tilted relative to the first-input words (see the displaced parts in FIG. 1I).

Regarding the problem, the method disclosed in the above-described JP-A No. 2004-046637 hardly corrects handwritten information on the state that the sheet has been displaced in the middle of a user's handwriting input. Also the method disclosed in the above-described JP-A No. 2010-271830 hardly corrects handwritten information on the state that the sheet is displaced doe to insufficient lock with the sheet locking section. Furthermore, the methods disclosed in the above-described JP-A Nos. 2004-046637, 2010-271830 and 2013-033444 also have problems of the complicated constitution of the device and control and less versatility.

In view of that, one embodiment of the present invention provides a handwriting input device includes a touch panel which can detect a touch given through a sheet of paper put on the touch panel; and a control section. In the handwriting input device, the control section obtains position information of a touch point on the touch panel at first time intervals, and determines a location of a sheet of paper on the touch panel to obtain position information of a specific part of the sheet as sheet location information, at second time intervals. The control section further outputs the position information of the touch points and the sheet location information so as to be associated with each other. Optionally, the control section calculates displacement amounts of the sheet corresponding to the position information of the respective touch points on the touch panel, on a basis of a change of the sheet location information, and outputs the position information of the touch points and the displacement amounts of the sheet so as to be associated with each other. Further, the control section optionally corrects the position information of the touch points corresponding to the respective displacement amounts of the sheet, on a basis of the displacement amounts of the sheet.

That is, by using the sheet location information continually obtained, the displacement amounts of the sheet are calculated, and then the obtained handwriting information is corrected on the basis of the calculated displacement amounts of the sheet. Thereby, even if the sheet changes in angle during a handwriting input as illustrated in FIGS. 1B, 1E and 1H, the electronic data illustrated in FIGS. 1D, 1G and 1J, in other words, handwriting information as actually handwritten on a sheet on the device can be obtained. In the embodiment, the calculation of the displacement amounts of the sheet and the correction of the handwriting data may be conducted in the handwriting input device or in an external device. Further, the handwriting information may be corrected in real time or in an arbitrary timing, such as at a time when the handwriting input is completed and at a time when the displacement of the sheet is no longer found.

EXAMPLE

Figure 2A:
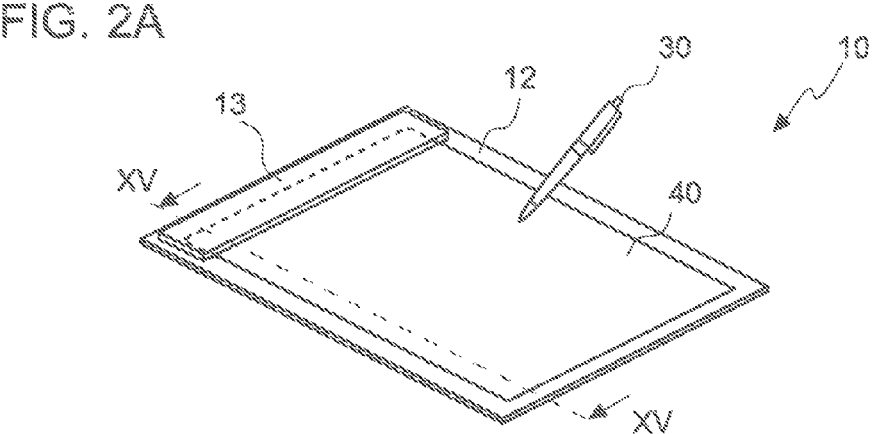
FIGS. 2A and 2B are diagrams for illustrating as external appearance of a handwriting input device according to one embodiment of the present invention.
Figure 2B:
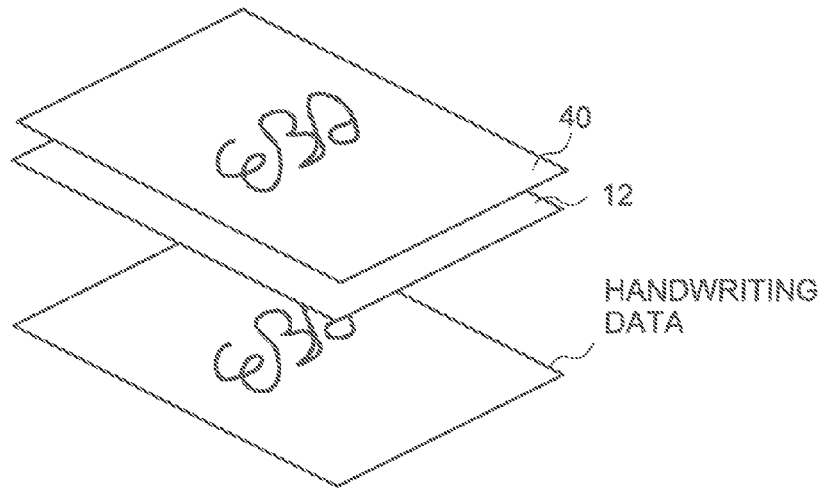

In order to describe the above-mentioned embodiment more in detail, description is given to an illustrative handwriting input device, an illustrative method for obtaining handwriting information, and an illustrative handwriting information obtaining program with reference to FIG. 2A to FIG. 32C. FIGS. 2A and 2B are diagrams illustrating an external appearance of a handwriting input device of the present example. FIG. 3 to FIG. 7 each is a block diagram illustrating a constitution of the handwriting input device (or a processing device). FIG. 8A to FIG. 14 are flowcharts illustrating processing of the handwriting input device (and the processing device) of the present example. FIGS. 15A and 15B and FIGS. 16A and 16B illustrate a pressure distribution caused by the pressing of a holding section of the handwriting input device of the present example by using the sectional views of the handwriting input device taken along line XV-XV in FIG. 2A. FIGS. 17A to 17F and FIGS. 18A to 18F are schematic diagrams for illustrating a method for determining the location of a sheet by the pressure of the holding section. FIG. 19 is a diagram illustrating one example of a locus of handwriting information. FIG. 20 illustrates an example of a table showing handwriting information and sheet location information. FIG. 21 to FIG. 29 each is a schematic diagram for illustrating a method for setting a line segment flag of handwriting information. FIGS. 30A to 30D and FIGS. 31A to 31E are schematic diagrams for illustrating displacement of a sheet. FIGS. 32A to 32C illustrate another example of a table showing handwriting information and sheet location information according to one embodiment of the present invention.

As illustrated in FIG. 2A, handwriting input device 10 of the present example includes a sensor to be placed beneath a sheet of paper. The handwriting input device 10 is configured to, on a user's handwriting operation on a sheet of paper with a pen, detect the movement of the pen through the sheet by the sensor and convert the movement into electronic data. In concrete terms, the handwriting input device 10 includes touch panel 12 and a holding section 13, such as a clip, where the touch panel 12 can be of a type such as a pressure-sensitive type, an electromagnetic induction type, and a magnetic detection type, and the holding section 13 holds sheet 40 on touch panel 12. Touch panel 12 can detect a touch or pressing given through a sheet or sheets of paper. Therefore, as illustrated in FIG. 2B, in response to an user's handwriting input performed with pen 30 on one or more sheets 40 put on touch panel 12, touch panel 12 detects touches given by the pen 30 and then the handwriting input device 10 outputs handwriting information representing the movement locus of a pressed point or touch point as handwriting data.

Figure 3:
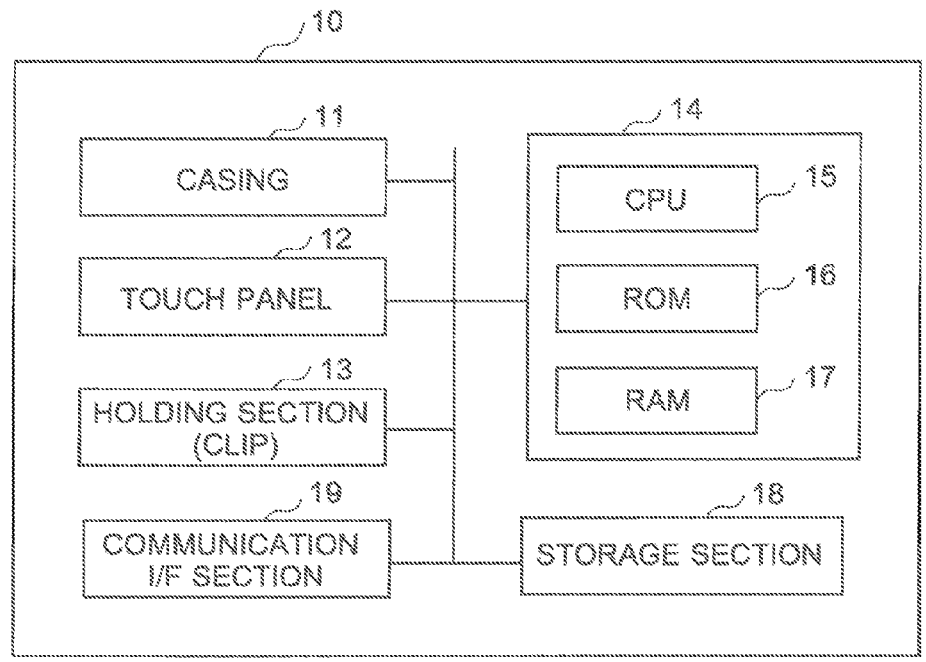
FIG. 3 is a block diagram illustrating a constitution of a handwriting input device according to one embodiment of the present invention.

FIG. 3 is a hardware constitution diagram of the handwriting input device 10. The handwriting input device 10 of the present example includes casing 11, touch panel 12, holding section 13, control section 14, storage section 18, and communication interface (I/F) section 19.

Casing 11 is a member which supports touch panel 12. Casing 11 contains control section 14, storage section 18, and communication I/F section 19, and holds holding section 13 to be rotatable at an edge part of a face (surface) of the casing 11 on the side of touch panel 12.

Touch panel 12 can be, for example, a digital (matrix) resistive touch panel in which electrodes are arranged in a lattice. The touch panel 12 is disposed on a surface of casing 11 and includes a region (referred to as a sheet holding region) where holding section 13 holds a sheet or sheets of paper and a region (referred to as a handwriting input region) where a user is allowed to make a handwriting input with pen 30 or the like. The touch panel 12 is configured to detect a pressing force given by holding section 13 in the sheet holding region, and a pressing force given by pen 30 in the handwriting input region, and output signals corresponding to these kinds of pressing force to the control section 14. Touch panel 12 may have a structure that the sheet holding region adjoins the handwriting input region (for example, a structure such that a part of the handwriting input region is used as the sheet holding region), or may have a structure that the sheet holding region is separated from the handwriting input region. Touch panel 12 may be configured to have an electrode gap (a pressure detecting pitch), a pressure detection sensitivity and a pressure detection range which are the same between the sheet holding region and the handwriting input region, or are different between the sheet holding region and the handwriting input region. For example, since the pressing force given by holding section 13 is generally smaller than, the pressing force given by pen 30, the pressure detection sensitivity in the sheet holding region may be made higher than, that of the handwriting input region. Further, touch panel 12 may be configured to have an electrode gap (a pressure detecting pitch), a pressure detection sensitivity and a pressure detection range on the sheet holding region which are uniform within the sheet holding region, or change inside the sheet holding region. For example, since touch panel 12 is needed in the sheet holding region to detect a pressing force in at least a contacting part with holding section 13, the touch panel 12 may have an electrode gap which is narrowed in the contacting part in comparison with that in the other part, and a pressure detection sensitivity which is made higher in the contacting part than that in the other part. Furthermore, the touch panel 12 in the present example is assumed to be of a pressure-sensitive type which can sense a pressing force, but the touch panel 12 may be of another type, such as an electromagnetic induction type and a magnetic detection type. Hereinafter, the description will be given under the assumption that the touch panel 12 is of an electromagnetic induction type.

Holding section 13 is disposed in the vicinity of one side of casing 11. One end of holding section 13 is fixed to casing 11 so that the other end of holding section 13 can move and press touch panel 12 through sheet 40 by using a spring or flexibility of the material of the holding section 13. Holding section 13 includes pressing sections (protruding sections) and has a shape such that, when sheet 40 is put on casing 11 so as not to protrude from the casing 11, the pressing sections are laid across the edges of the sheet 40 at at least the following points: two points on one side (the side closest to the holding section 13) of the sheet 40 and one point on another side neighboring to the former side. Description will be given later to the detailed structure of the holding section 13.

Control section 14 includes CPU (Central Processing Unit) 15 and memories including ROM (Flash ROM) 16 and RAM (Random Access Memory) 17. CPU 15 loads control programs recorded in ROM 16 or storage section 18 onto RAM 17 and executes the control programs, thereby performing the whole control of the handwriting input device 10. Description will be given later to the detailed structure of the control section 14.

Storage section 18 can be a storage such as SD (Secure Digital) card and a SSD (Solid State Drive), and is configured to store data of various kinds of information used by control section 14. For example, the storage section 18 may store data of pressure information obtained through touch panel 12, handwriting information (position information of touch points) obtained, by handwriting information obtaining section 14b, sheet location information determined by sheet location determining section 14c, displacement amounts of a sheet calculated by displacement mount calculating section 14d, and handwriting information corrected by handwriting information correcting section 14e, which will be described later.

Communication I/F sections 19 cars be a component such as a USB (Universal Serial Bus) terminal and a modem, and can output electronic data of handwriting information created by control section 14 to external devices via cable communications or wireless communications in accordance with standards, such as NFC (Near Field Communication), Bluetooth (registered trademark), and TransferJet (registered trademark).

Figure 4:
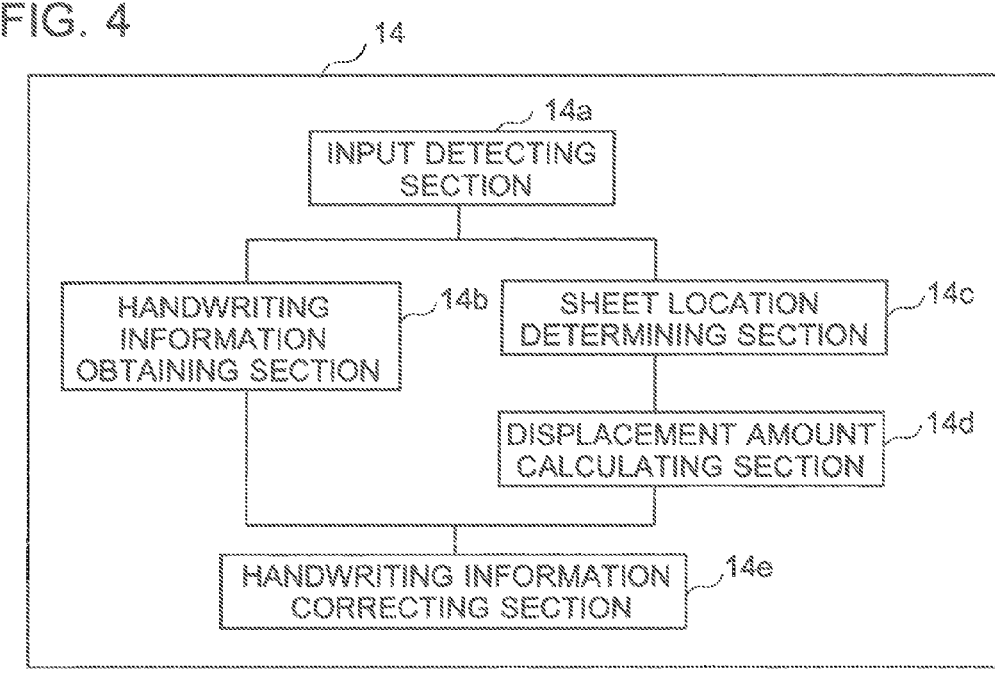
FIG. 4 is a block diagram illustrating a constitution of a control section of the handwriting input device according to one embodiment of the present invention.

FIG. 4 is a functional block diagram of the above-mentioned control section 14. The control section 14 works as input detecting section 14a, handwriting information obtaining section 14b, sheet location determining section 14c, displacement amount calculating section 14d, and handwriting information correcting section 14e.

Input detecting section 14a is configured to detect a position pressed by pen 30 or holding section 13 and the pressure on the basis of signals output, from touch panel 12.

Handwriting information obtaining section 14b is configured to perform the following processing. Handwriting information obtaining section 14b obtains position information of a pressed point or a touch point (handwriting information) in the handwriting input region in touch panel 12 at certain, sampling intervals, where the pressed point or touch point is a point pressed by pen 30 or a user's hand. Handwriting information obtaining section 14b stores in storage section 18 the obtained position information (referred to as pen position information in order to distinguish from sheet location information which will be described later) with being associated with rime. At that time, handwriting information obtaining section 14b determines whether the pressing was made by pen 30 or by a band on the basis of the size of the pressed point and/or the pressing force. Further, if needed, handwriting information obtaining section 14b sets a line segment flag which will be described later, on the basis of pen position information about plural pressed points obtained in the past sampling times.

Sheet location determining section 14c is configured to perform the following processing. Sheet location determining section 14c obtains position information and pressure information about, the pressed positions given by holding section 13 in the sheet holding region at certain sampling intervals. On the basis of the position information and pressure information, sheet location determining section 14c determines the position of two or three sides of the sheet put on touch panel 12. On the basis of the determined two or three sides of the sheet, sheet location determining section 14c further determines the location of the sheet on touch panel 12 and obtains position information of specific parts (for example, the upper left point and the lower right point) of the sheet, as sheet location information. Sheet location determining section 14c stores in storage section 18 the obtained sheet location information with being associated with time. In this processing, the sampling interval for obtaining pen position information (handwriting information) and the sampling interval for determining the location of the sheet on touch panel 12 and obtaining position information of the specific parts of the sheet may be the same or different. For example, the sheet location determining section 14c may determine the location of the sheet on the touch panel 12 at sampling intervals each of which is longer than the sampling interval for obtaining pen position information.

In concrete terms, sheet location determining section 14c determines multiple points which locate in the vicinity of edges of the sheet and at which the value of pressing force becomes smaller than those at other points (preferably, becomes zero), and connects the determined multiple points linearly (using lines) to each other, whereby determining one side of the sheet and one or two sides neighboring to the one side. Successively, sheet location determining section 14c determines the location of the sheet on touch panel 12 on the basis of the determined three sides, or determines the location of the sheet on touch panel 12 on the basis of the determined two sides and the size of the sheet. The way of determining the location of a sheet will be described later. If needed, the sheet location determining section 14c sets a sheet change flag which will be described later, on the basis of the sheet location information about plural locations of the sheet (plural pieces of position information of the same specific part of the sheet) obtained in the past sampling times.

In the present example, the location of a sheet is determined on the basis of the positions pressed by holding section 13 and the pressing force. However, the location of a sheet may also be determined by using other methods. For example, in the case of using touch panel 12 of an electromagnetic induction type or a magnetic detection type, there is provided an imaging section such as a CCD (Charge Coupled Devices) camera on casing 11 and in the vicinity of holding section 13, and a specific part of a sheet (for example, a corner of the sheet) is imaged by the imaging section. By conducting image processing (for example, edge detection) on the obtained image using a well-known technique, and detecting a position change of the specific part, the sheet location can be determined.

On the basis of a change of the sheet location information determined by sheet location determining section 14c, displacement amount calculating section 14d is configured to calculate a displacement amount of the sheet. In concrete terms, on the basis of the change of position information of specific parts (for example, the upper left point and the lower right point) of the sheet, displacement amount calculating section 14d obtains the movement amount and the turned amount of the sheet and outputs the movement amount and the turned amount as the displacement amount of the sheet. Alternatively, the displacement amount can be a difference of sheet location information of the previous sheet location (the location of the sheet determined at the last sampling time) and sheet location information, of the current sheet location (the location, of the sheet determined at the current sampling time), or a difference of sheet location information when the sheet is put on a proper position on touch panel 12 (reference position information) and sheet location information of the current sheet location. Further, under the condition that the sampling interval for obtaining the handwriting information is different from the sampling interval for obtaining the sheet location information and there is no sheet location information corresponding to the handwriting information about a point concerned (for example, the location of the sheet on touch panel 12 is determined at longer sampling intervals than the sampling intervals for obtaining pen position information, and sheet location information corresponding to position information of a touch point concerned is not found), displacement amount calculating section 14d calculates the sheet location information corresponding to the position information of the touch point concerned on the basis of the sheet location information about a predetermined number of sheet locations obtained at sampling times immediately before obtaining the position information of the touch point concerned. Then, by using the calculated sheet location information, location displacement amount calculating section 14d calculates the displace amount of the sheet corresponding to the position information of the touch point concerned. For example, displacement amount calculating section 14d complements or interpolates sheet location information about the sheet locations and calculates the displacement amount of the sheet, using a sheet change flag. Then, displacement amount calculating section 14d stores the calculated displacement amounts of the sheet with associated with time, into storage section 18.

On the basis of the displacement amounts of the sheet calculated by displacement amount calculating section 14d, handwriting information correcting section 14e is configured to correct the pen position information (position information of touch points) obtained by handwriting information obtaining section 14b, and correct the handwriting information so as to become the same pattern as the handwriting information actually input by the handwriting onto sheet 40. The handwriting information correcting section 14e is configured to, if needed, weed out the corrected handwriting information (corrected position information of touch points) by using a line segment flag. The handwriting information correcting section 14e is configured to, in the case where the sampling interval for obtaining handwriting information differs from the sampling interval for obtaining position information, complement or interpolate handwriting information (position information of touch points) by using a line segment flag.

The input detecting section 14a, the handwriting information obtaining section 14b, the sheet location determining section 14c, the displacement amount calculating section 14d, and the handwriting information correcting section 14e may be provided as hardware devices. Alternatively the input detecting section 14a, the handwriting information obtaining section 14b, the sheet location determining section 14c, the displacement amount calculating section 14d, and the handwriting information correcting section 14e (in particular, as the handwriting information obtaining section 14b, the sheet location determining section 14c, the displacement amount calculating section 14d, and the handwriting information correcting section 14e) may be provided by a handwriting information obtaining program which causes the control section 14 to function as these sections when being executed. That is, the control section 14 may be configured to serve as the input detecting section 14a, the handwriting information obtaining section 14b, the sheet location determining section 14c, the displacement amount calculating section 14d, and the handwriting information correcting section 14e (in particular, as the handwriting information obtaining section 14b, the sheet location determining section 14e, the displacement amount calculating section 14d, and the handwriting information correcting section 14e), when CPU 15 executes the handwriting information obtaining program.

The determining of the location of the sheet may be performed during a period when handwriting information obtaining section 14b obtains handwriting information (position information of touch points) at certain sampling intervals (for example, the location of the sheet may be determined only during a period when the handwriting input is being performed at certain sampling intervals). The determining of the location of the sheet can be performed successively at certain sampling intervals, wherein, the determining the location of the sheet may be performed so as not to be synchronized with the obtaining of handwriting information position (information of touch points), which will be described later. Further, the correcting of handwriting information may be performed only at the time when the displacement amount calculating section 14d has found a displacement of the sheet. Alternatively, the correcting of handwriting information may be performed each time when handwriting information obtaining section 14b obtains handwriting information (position information of a touch point), or may be performed after handwriting information obtaining section 14b obtains a piece of handwriting information including position information of a series of touch points on the touch panel 12.

Figure 5:
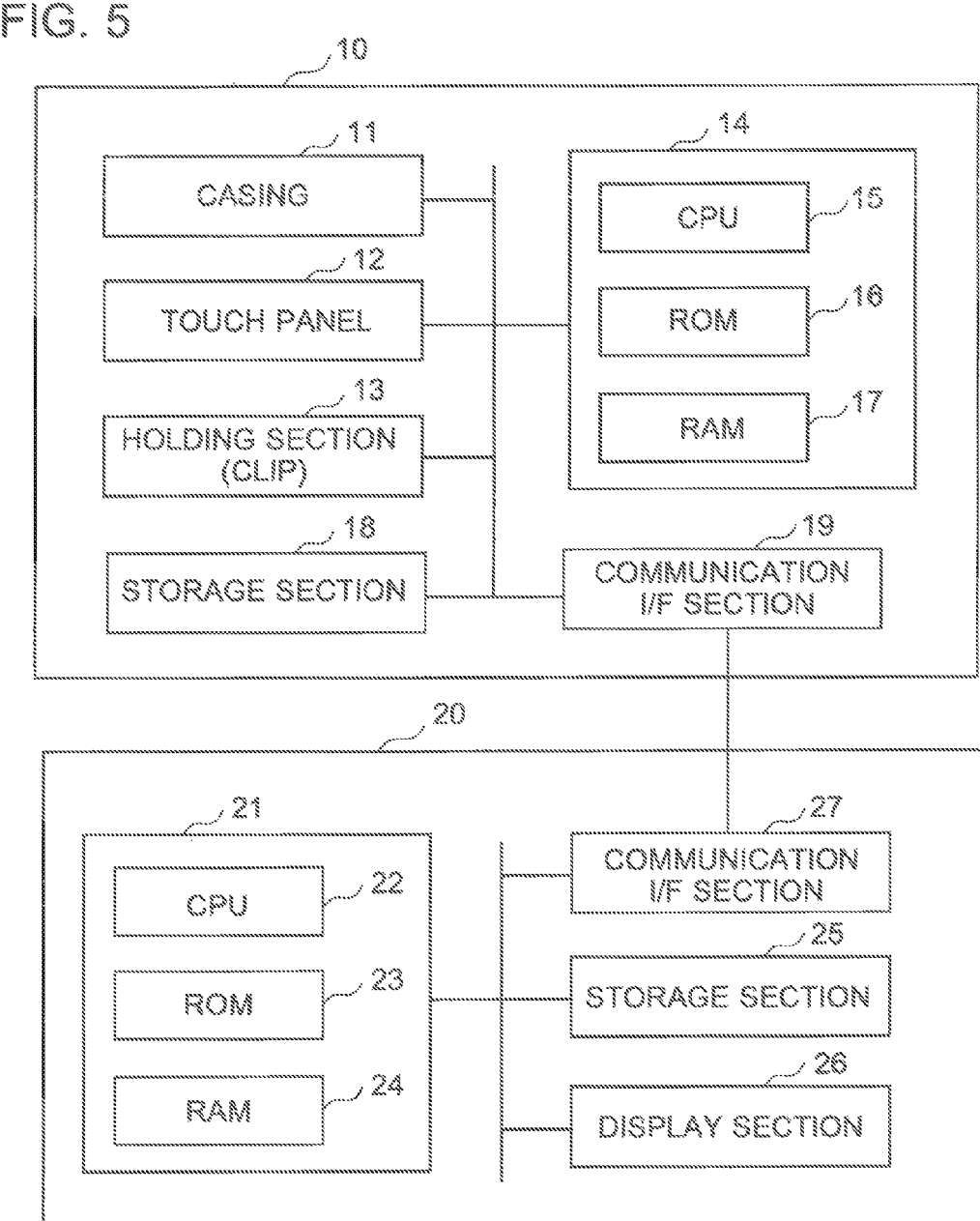
FIG. 5 is a block diagram illustrating a constitution of the handwriting input system according to one embodiment of the present invention.
Figure 6:
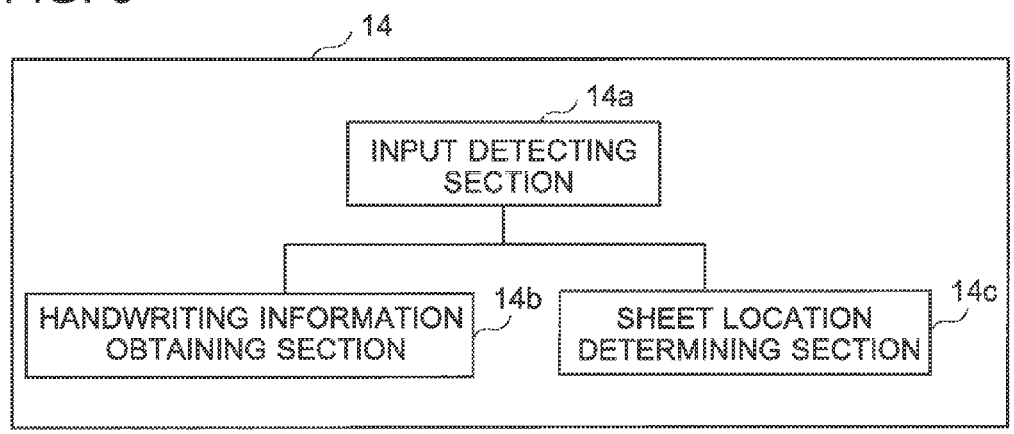
FIG. 6 is a block diagram illustrating a constitution of a control section of a handwriting input device in the handwriting input system according to one embodiment of the present invention.
Figure 7:
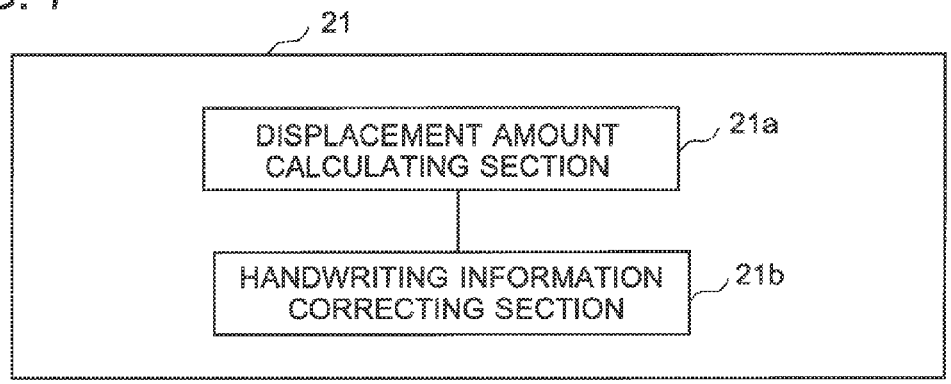
FIG. 7 is a block diagram illustrating a constitution of a control section of a processing device in the handwriting input system according to one embodiment of the present invention.

The present example is constituted such that the correcting of handwriting information is performed in the control section 14 of the handwriting input device 10. Alternatively, the correcting of handwriting information may be performed in another device which uses dm handwriting information. As an example, a system illustrated, in FIG. 5 is considered, where handwriting input device 10 in the system is communicably connected with processing device 20 which is configured to use handwriting information (for example, to display handwriting information). In the system of FIG. 5, handwriting input device 10 includes casing 11, touch panel 12, holding section 13, control section 14, storage section 18 and communication interface (I/F) section 19, and processing device 20 includes control section 21, storage section 25, display section 26 and communication interface (I/F) section 27. The control section 21 of processing device 20 includes CPU 22, ROM 23 and RAM 24, similarly to the control section of 14 of handwriting input device 10. In such a system, the control section 14 of handwriting input device 10 may be configured to serve as the input detecting section 14a, the handwriting information obtaining section 14b, and the sheet location determining section 14c as illustrated in FIG. 6, and control section 21 of processing device 20 may be configured to serve as displacement amount calculating section 21a and handwriting information correcting section 21b as illustrated in FIG. 7. In such a case, the control section 14 of the handwriting input device 10 may output to processing device 20 the pen position information obtained by the handwriting information obtaining section 14b and the sheet location information determined by the sheet location determining section 14c with being associated with each other.

Alternatively, the control section 14 of the handwriting input device 10 may be configured to serve as the input detecting section 14a, the handwriting information obtaining section 14b, the sheet location determining section 14c and displacement amount calculating section 14d, and control section 21 of processing device 20 may be configured to serve as handwriting information correcting section 21b. In such a case, the control section 14 of the handwriting input device 10 may output to processing device 20 the pen position information obtained by the handwriting information obtaining section 14b and the corresponding displacement amounts of the sheet calculated by the displacement amount calculating section 14d with being associated with each other. In the case that control section 21 of processing device 20 is configured to serve as displacement amount calculating section 21a and handwriting information correcting section 21b (or handwriting information correcting section 21b), CPU 22 of processing section 20 may execute handwriting information obtaining program so as to realize these sections.

Hereinafter, description is given to an example of the processing (in the case where handwriting information is corrected in real time) in the handwriting input device 10 with the above-mentioned structure. CPU 15 executes processes in the steps shown in the flowchart of FIGS. 8A and 8B by loading the handwriting information obtaining program stored in ROM 16 or storage section 18 onto RAM 17 and executing the program.

When a sheet of paper is set on touch panel 12 of handwriting input device 10 (S101), the sheet location determining section 14c determines the location of the sheet on the basis of foe pressure information and the position information of pressed points detected in the sheet holding region, by input detecting section 14a, and sets sheet location information (S102). The sheet location information is represented by using two figures indicating the number of obtaining times of the sheet location information before obtaining the sheet location information about the current sheet location, and a specific position on the sheet (the position of the initial point of the sheet is represented by "0" and the position of the terminal point of the sheet is represented by "1"). For example, the information of the initial point and the terminal point of the initial sheet location are represented by (0, 0) and (0, 1), respectively.

Figure 15A:
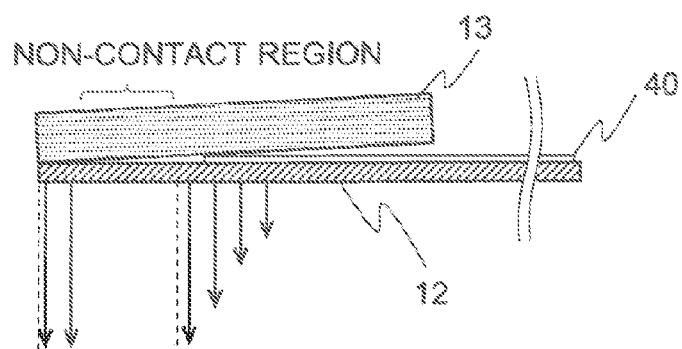
FIGS. 15A and 15B are a diagram and a graph for illustrating an example of a pressure distribution caused by the pressing with a holding section of the handwriting input device according to one embodiment of the present invention.
Figure 15B:
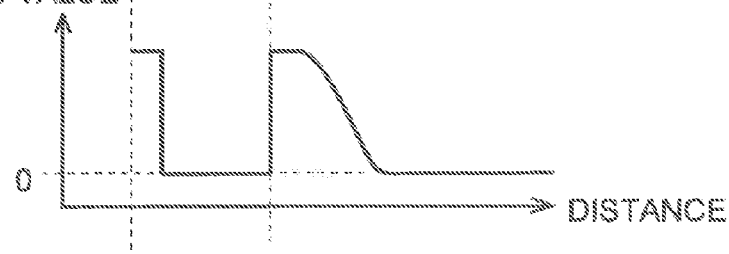
Figure 16A:
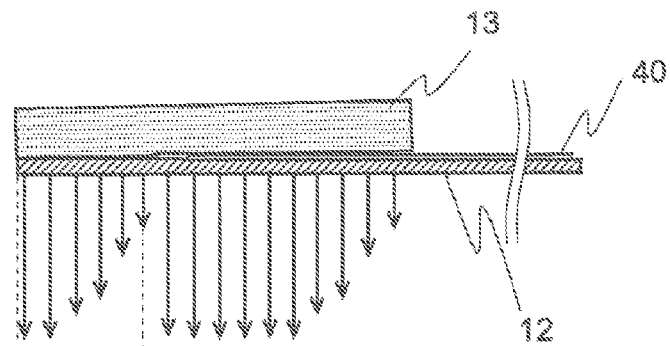
FIGS. 16A and 16B are a diagram and a graph for illustrating another example of a pressure distribution caused by the pressing with a holding section of the handwriting input device according to one embodiment of the present invention.
Figure 16B:
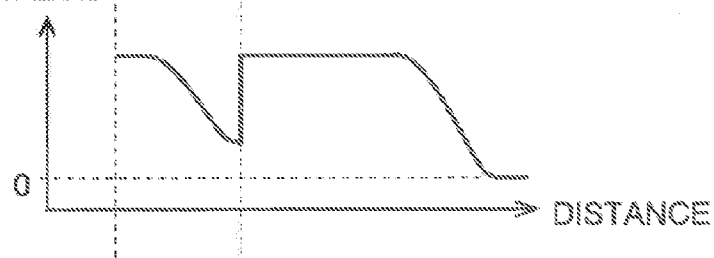

Description is given to one example of a method of determining the above-mentioned sheet location. First, description is given to a method of determining an edge of sheet 40 from the distribution of a pressure value with reference to FIGS. 15A and 15B and FIGS. 16A and 16B. FIGS. 15A and 15B and FIGS. 16A and 16B illustrate a state when holding section 13 (clip) gives a pressing force to the sheet holding region of touch panel 12. Each of FIG. 15A and FIG. 16A is a cross sectional view of the handwriting input device 10 taken along line XV-XV in FIG. 2A, and each of FIG. 15B and FIG. 16B is a graph of the distribution of the pressure value. The vertical axis and the horizontal axis of each of the graphs in FIGS. 15B and 16B represent the pressure value and the distance on the touch panel 12, respectively.

For example, the condition that, as illustrated in FIG. 15A, the pressing surface of holding section 13 is a flat surface, one end of holding section 13 is brought in contact with the sheet holding region of touch panel 12 and the other end moves in the direction to press sheet 40, will be considered. Under this condition, a non-contact region where holding section 13 does not come in contact with touch panel 12 appears in the vicinity of as edge of sheet 40 because of the thickness of sheet 40. It makes the pressure value obtained by the input detecting section 14a relatively large at the one end of holding section 13 and the edge of sheet 40, and makes the pressure value relatively small (ideally, 0) at the non-contact region between the end of holding section 13 and the edge of sheet 40 as illustrated in FIG. 15B. Accordingly, by finding a portion where the pressure value changes from a relatively small value (the pressure value in the non-contact region) to the relatively large value, the edge position of sheet 40 can be defined. In FIG. 15A, in order to snake the description easy, the width of the non-contact region is drawn as larger. However, since the actual width is about several millimeters, the portion where the pressure value becomes relatively small can be defined as an edge of sheet 40, which causes no problem.

FIGS. 15A and 15B illustrate an example that each of the surface of touch panel 12 and the pressing surface of holding section 13 keeps a flat surface. However, in an actual structure, as illustrated in FIGS. 16A and 16B, the thickness of sheet 40 is sufficiently small, and each of the surface of touch panel 12 and the pressing surface of holding section 13 may deform, to some extent. In such a structure, the pressure value may not become zero. Even in the structure, a portion where the pressure value relatively small, appears in the vicinity of an edge of sheet 40. Accordingly by finding the portion where a pressure value changes from a relatively small value to a relatively large value (or a portion where a pressure value becomes relatively small), the position of an edge of sheet 40 can be defined.

Figure 17A:
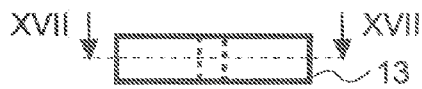
FIGS. 17A to 17F are schematic diagrams for illustrating a method for determining the location of a sheet by the pressure of the holding section of the handwriting input device according to one embodiment of the present invention.
Figure 17C:
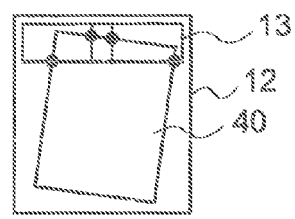
Figure 17B:
Figure 17D:
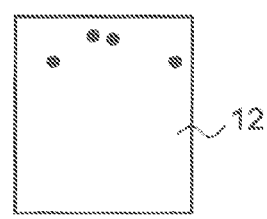
Figure 17E:
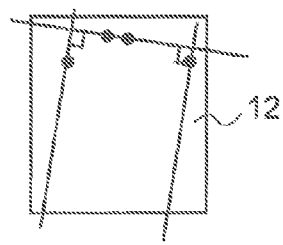
Figure 17F:
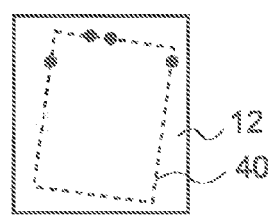
Figure 18A:
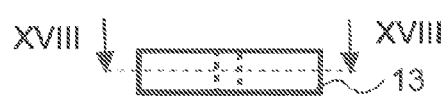
FIGS. 18A to 18F are schematic diagrams for illustrating a method for determining the location of a sheet by the pressure of the holding section of the handwriting input device according to one embodiment of the present invention.
Figure 18C:
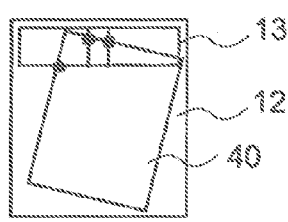
Figure 18B:
Figure 18D:
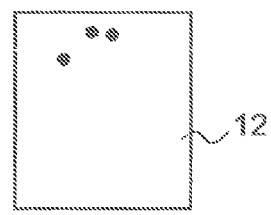
Figure 18E:
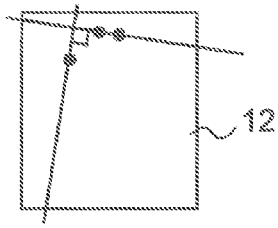
Figure 18F:
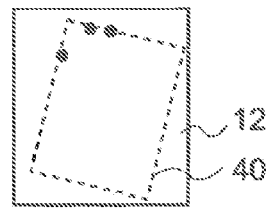
Figure 19:
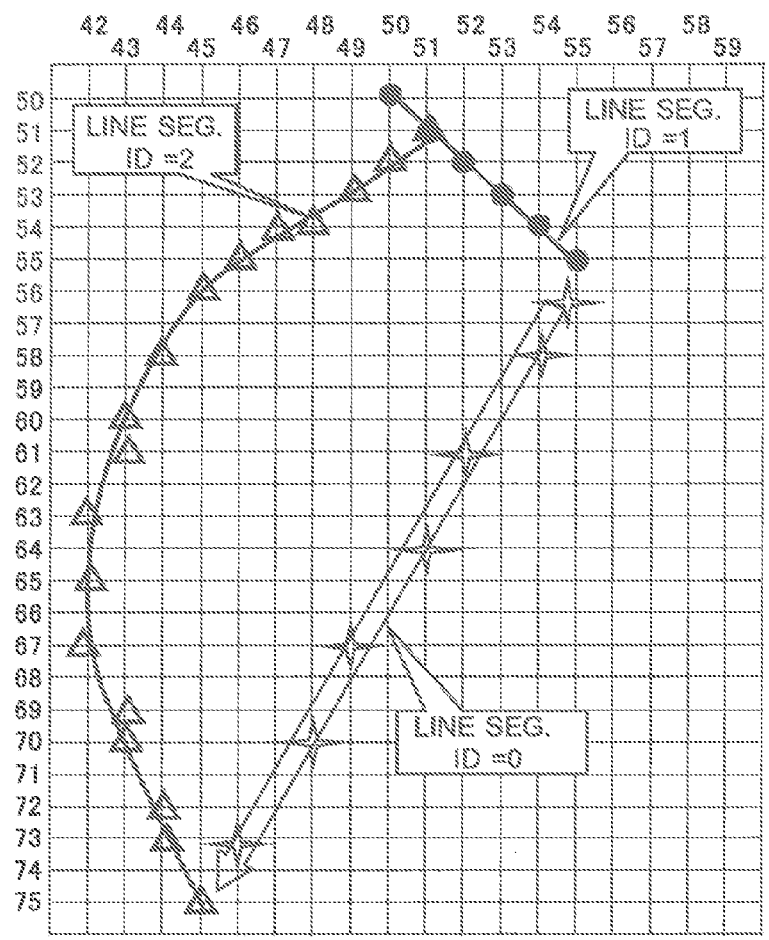
FIG. 19 is a diagram illustrating an example of a locus of handwriting information according to one embodiment of the present invention.

Next, description is given to a method of determining sides of sheet 40 from the plural positions on the edges which have bees determined and to a method of determining the location of sheet 40 from the determined sides of sheet 40 with reference to FIGS. 17A to 17F and FIGS. 18A to 18F. FIGS. 17A to 17F and FIGS. 18A to 18F illustrate a way to determine the location of sheet 40 by using holding section 13 (clip) in a predetermined shape. FIGS. 17A and 17B and FIGS. 18A and 18B illustrate the shape of the holding section 13 (clip). FIG. 17A and FIG. 18A are top views of the clip, and FIGS. 17B and 18B are sectional views of the clip taken along line XVII-XVII in FIG. 17A and line XVIII-XVIII in FIG. 18A, respectively. Each of FIG. 17C and FIG. 18C illustrates a positional relationship between sheet 40 on touch panel 12, and the clip. Each of FIG. 17D and FIG. 18D illustrates pressed positions detected by input detecting section 14a. Each of FIG. 17E and FIG. 18E illustrate a way to determine lines passing the pressed positions. Each of FIG. 17F and FIG. 18F illustrate a way to determine the placed position of the sheet from the determined lines.

Consideration is given to a case where holding section 13 (clip) is made to a shape such that two pressing sections extending in the vertical direction are added to the inside of an outer frame of the clip as illustrated in FIGS. 17A and 17B, and the clip and the sheet are arranged in a positional relationship illustrated in FIG. 17C. The clip in such a shape includes two pressing sections which extends in the vertical direction (the direction perpendicular to one edge of the clip fixed onto casing 11) and one pressing section which extends in the horizontal direction (the direction of the one edge of the clip fixed onto casing 11), where the two pressing sections extending in the vertical direction are laid across an edge of sheet 40 at two points on the upper side of sheet 40, and the pressing section extending in the horizontal direction is laid across edges of sheet 40 at one point on the left side of sheet 40 and one point on the right side of sheet 40. In this arrangement, sheet location determining section 14c can determine that the four points (pressing positions) illustrated in FIG. 17D are on edges of sheet 40 in accordance with the technique illustrated in FIGS. 15A and 15B and FIGS. 16A and 16B. Next, as illustrated in FIG. 17E, sheet location determining section 14c determines the upper side of sheet 40 by making a straight line passing two points pressed by the two pressing sections extending in the vertical direction, among the four points determined in FIG. 17D. Successively, sheet location determining section 14c determines each of the left and right sides of sheet 40 by making a straight line crossing the above straight line at right angles and passing one of the two points pressed by the pressing section extending in the horizontal direction, among the four points determined in FIG. 17D. In the case where handwriting input device 10 uses standard-sized sheets of paper, such as A4 type and B5 sheets, sheet location determining section 14c can determine the location of sheet 40 by using the determined three sides, as illustrated in FIG. 1F, and further can determine a representative point which defines the location of sheet 40 (fee above-described initial point and terminal point) and the inclination of sheet 40. That is, sheet location determining section 14c can determine the location of sheet 40 by determining two points on one side of sheet 40 and one point on each of two sides of sheet 40 neighboring to the one side.

In FIGS. 17A to 17F, description is given to the way to determine at least four points on the edges of sheet 40. In the case where a sheet size placed on touch panel 12 has already been fixed, sheet location determining section 14c can determine the placed position of sheet 40 by determining two sides of sheet 40, which are the upper side and the left side (or the right side). For example, under the condition that, in handwriting input device 10 such that holding section 13 (clip) has a shape as illustrated in FIGS. 18A and 18B (similar shape as that in FIGS. 17A and 17B), the clip and a sheet are arranged in the positional relationship illustrated in FIG. 18C, the two pressing sections extending in the vertical direction are laid across an edge of sheet 40 at two points on the upper side of sheet 40, and the pressing section extending in the horizontal direction is laid across edges sheet 40 at one point on the left side. In this arrangement, sheet location determining section 14c can determine that the three points (pressed positions) illustrated in FIG. 18D are on edges of sheet 40. Next, as illustrated in FIG. 18E, sheet location determining section 14c determines the upper side of sheet 40 by making a straight line passing two points pressed by the two pressing sections extending in the vertical direction, among the three points determined in FIG. 18D. Successively, sheet location determining section 14c determines the left side of sheet 40 by making a straight line crossing the above straight line at right angles and passing the rest of the three points. In the case where handwriting input device 10 uses standard-sized sheets of paper, sheet location determining section 14c can determine the position of sheet 40 by using the determined two sides, as illustrated in FIG. 18F. That is, sheet location determining section 14c can determine the location of sheet 40 by determining two points on the upper side of sheet 40 and one point on one of right and left sides of sheet 40.

Figure 8A:
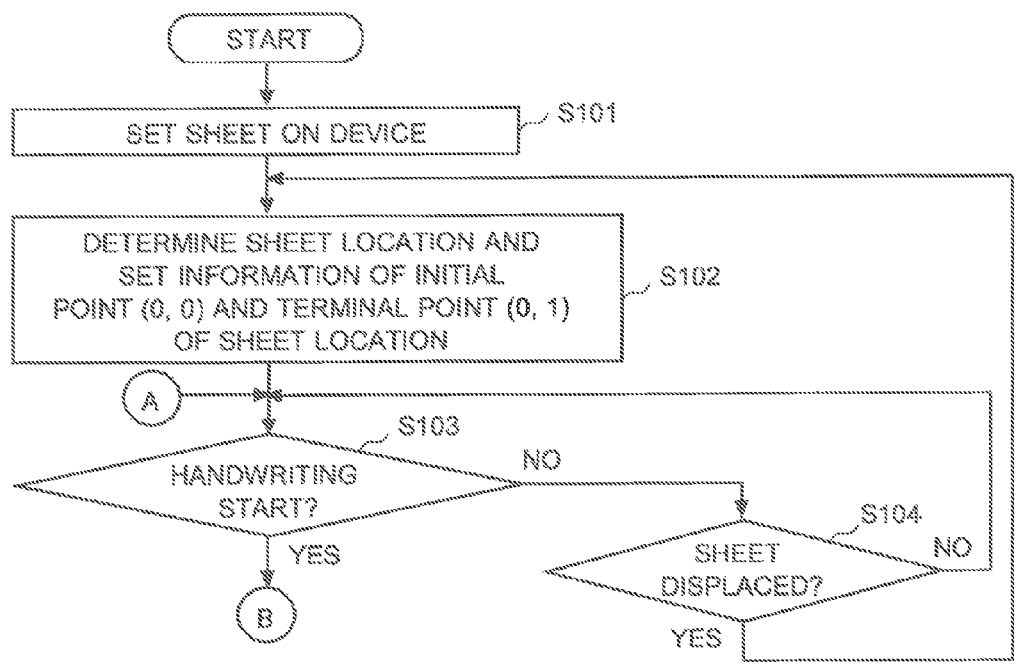
FIGS. 8A and 8B are a flowchart illustrating an example of the processing (in the case of correcting handwriting information in real time) of the handwriting input device according to one embodiment of the present invention.
Figure 8B:
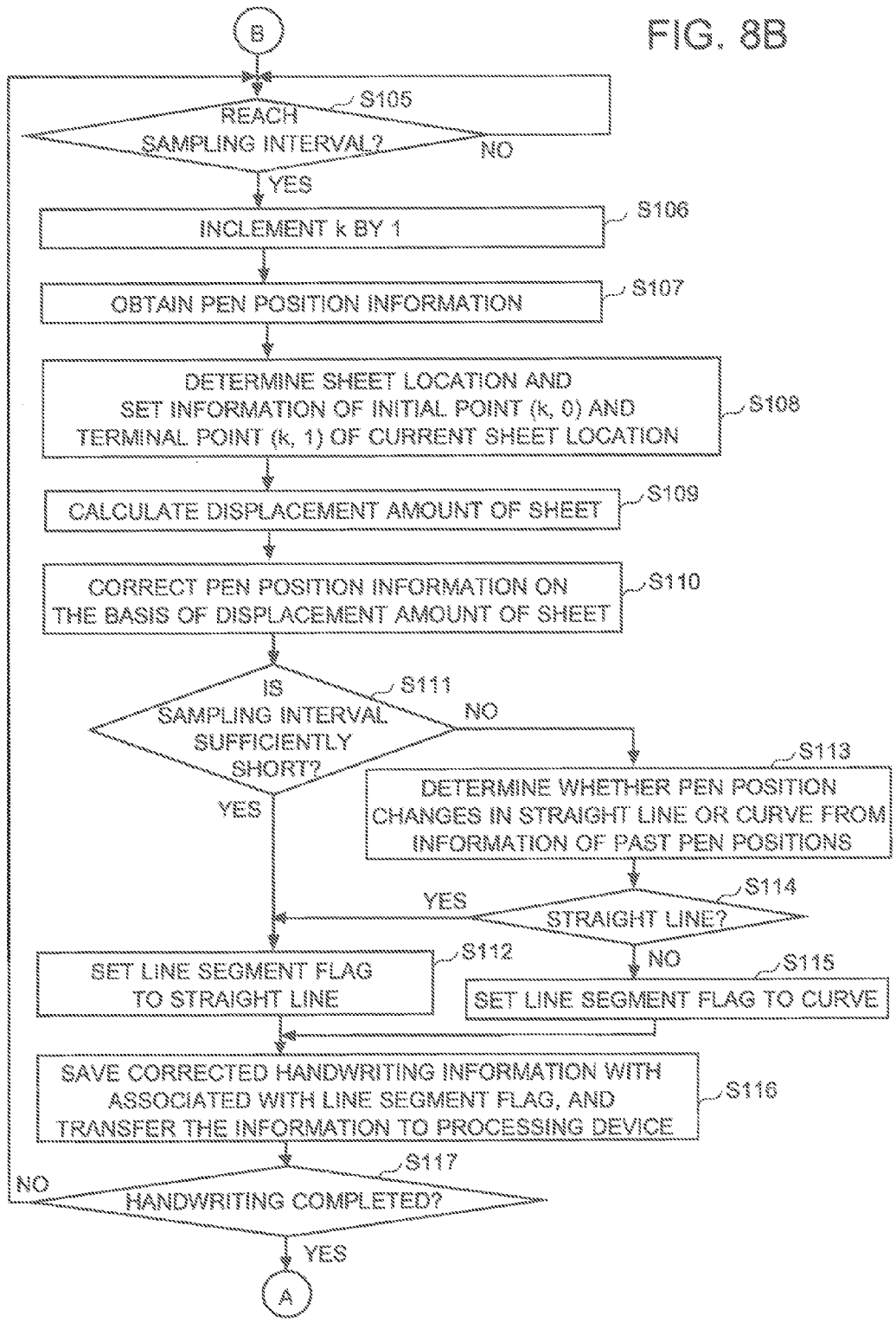
Figure 9A:
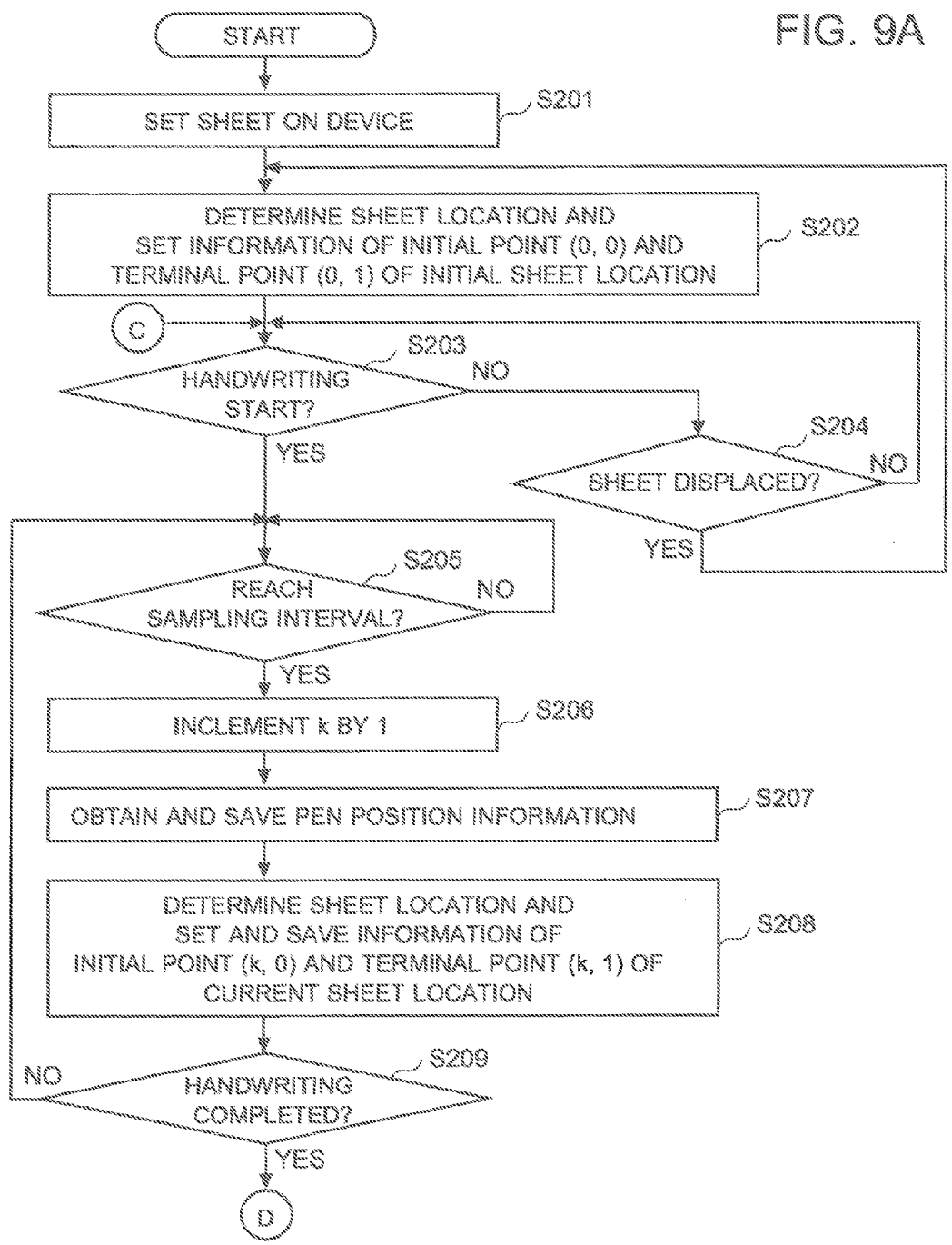
FIGS. 9A and 9B are a flowchart illustrating an example of the processing (in the case of correcting handwriting information after a completion of handwriting) of the handwriting input device according to one embodiment of the present invention.
Figure 9B:
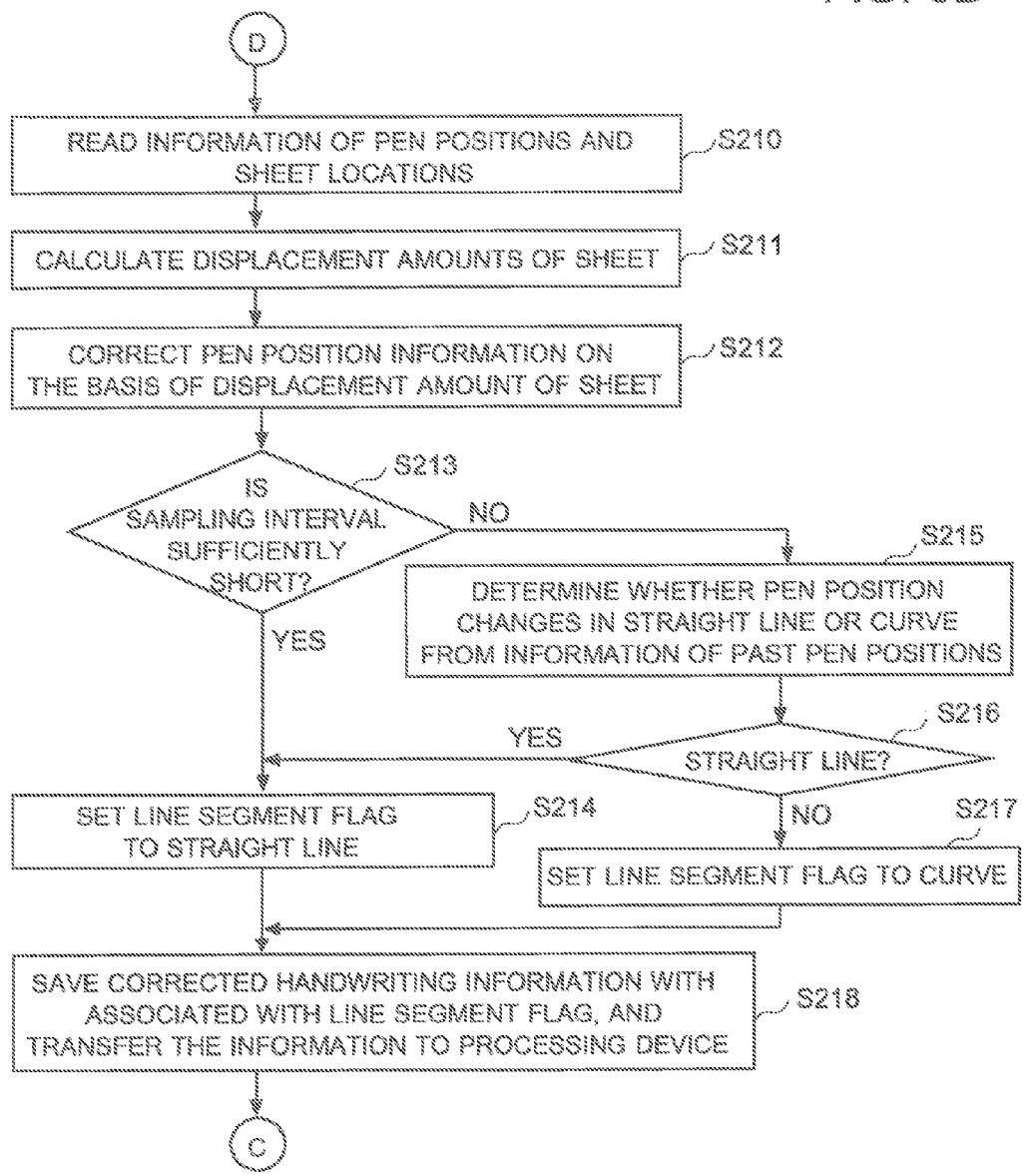

Now, description returns to the flowchart illustrated in FIGS. 8A and 8B. The input detecting section 14a determines on the basis of the output signals of the handwriting input region of touch panel 12 whether a handwriting input starts (S103). If no handwriting starts, displacement amount calculating section 14d determines on the basis of the location of the sheet determined by the sheet location determining section 14e whether the sheet is displaced (S104). If the sheet is not displaced, the processing returns to S103, and the start of a handwriting input is watched. On the other hand, if the sheet has been displaced, the processing returns to S102, and sheet location determining section 14c sets the information of the initial point and the terminal point of the current sheet location.

If a handwriting input has started at S103, control section 14 determines whether a predetermined sampling interval has been reached (S105). If the predetermined sampling interval has been reached, control section 14 increments "k" by 1 (S106), handwriting information obtaining section 14b obtains the pen position information (S107), and the sheet location determining section 14c determines the sheet location by using the above-mentioned techniques, and obtains and sets information of the initial point (k, 0) and the terminal point (k, 1) of the current sheet location as the position information of the specific parts of the sheet (S108). Then, displacement amount calculating section 14d calculates a displacement amount of the sheet on the basis of the information of the initial point and the terminal point of the previous sheet location (the sheet location determined at the last sampling time) and the information of the initial point and the terminal point at the current sheet location (the sheet location determined at the current sampling time) (S109). At this time, displacement amount calculating section 14d may calculate the displacement amount of the sheet on the basis of the information of the initial point and the terminal point of the sheet location when the sheet is located in a proper position on touch panel 12 (information of a reference position) and the information of the initial point and the terminal point at the current sheet location. Then, handwriting information correcting section 14e corrects the pen position information obtained by handwriting information obtaining section 14b on the basis of the displacement amount of the sheet calculated by displacement amount calculating section 14d (S110).

Here, if the sampling interval is short, the number of pressed points obtained as pen position information increases, which makes the data size of the handwriting data to be saved or output large, and elongates drawing processing time of the handwriting data. If pen 30 is moving in a straight line, a reduction of position information of a moving pen so as to thin out the detected pen positions would cause no problem. Therefore, in the present example, as needed, information indicating whether pen 30 is moving in a straight line (referred to as a line segment flag) is employed, and a straight line or a curve is set to this line segment flag, whereby the pen position information is enabled to be reduced or thinned out at the time of using the handwriting information.

In concrete terms, handwriting information obtaining section 14b determines whether the sampling interval is sufficiently short (in other words, whether the sampling interval is smaller than a predetermined value, for example, 10 milliseconds) (S111). If the sampling interval is sufficiently short, the line segment flag is set to "straight line" since it can be considered that pen 30 moves in a straight line in the corresponding sampling period (S112). On the other hand, if the sampling interval is not sufficiently short, handwriting information obtaining section 14b determines whether the pen position information changes in a straight line or a curve on the basis of pen position information about plural pen positions obtained in past sampling times (S113). Then, if the pen position information changes in a straight line (Yes at S114), handwriting information obtaining section 14b sets the line segment flag to "straight line" (S112), and if the pen position information does not change in a straight line (No at S114), handwriting information obtaining section 14b sets the line segment flag to "curve" (S115).

Subsequently, handwriting information correcting section 14e saves the corrected handwriting information (including line segment IDs which define line segments forming the handwriting information, pen position information, a pen event which defines the state of the pen, time information about the pen) corrected, at S110, as needed, with being associated with the line segment flag set at S112 or S115.

Further, the handwriting information correcting section 14e transfers the handwriting information being associated with the line segment flag to an external device (for example, processing device 20 in FIG. 5) (S116). Then, input detecting section 14a determines on the basis of output signals of the handwriting input region in touch panel 12 whether the handwriting input has been completed (for example, whether any handwriting input has not been detected for a predetermined period or termination of the handwriting input is instructed) (S117). If the handwriting input has not been completed, the processing returns to S105, and the similar processing is performed in the next sampling period. If the handwriting input has been completed, the processing returns to S103, and a start of a handwriting input is watched.

In the above-mentioned flow, handwriting information is corrected in real time (that is, corrected for each time when pen position information is obtained). Alternatively, handwriting information can be corrected at an arbitrary timing, such as, at a timing when displacement amount calculating section 14d has found a displacement of a sheet and at a timing when the handwriting input has been completed and handwriting information obtaining section 14b obtains a piece of handwriting information including a series of touch points. Then, description is given to the processing of the handwriting input device 10 in such a case (in the case where handwriting information is corrected at a timing when the handwriting input has been completed). CPU 15 loads the handwriting information obtaining program stored in ROM 10 or storage section 18 onto RAM 17, and executes the program, thereby executing the processing in each step shown in the flowchart of FIGS. 9A and 9B.

When a sheet of paper is set on touch panel 12 of handwriting input device 10 (S201), sheet location determining section 14c determines the location of the sheet based on the pressure information and position information of pressed points detected in the sheet holding region by the input detecting section 14a, and sets information of the initial point (0, 0) and the terminal point (0, 1) of the sheet location (S202). Next, the input detecting section 14a determines whether a handwriting input has started (S203). If no handwriting input has started, displacement amount calculating section 14d determines whether the sheet is displaced (S204). If the sheet is not displaced, the processing returns to S203, and a start of a handwriting input is watched. On the other hand, if the sheet has been displaced, the processing returns to S202, displacement amount calculating section 14d sets information the initial point and the terminal point of the current sheet location.

If a handwriting input has started at S203, control section 14 determines whether a predetermined sampling interval has been reached (S205). If the sampling interval has been reached, control section 14 increments "k" by 1 (S206), handwriting information obtaining section 14b obtains pen position information and saves the information in the storage section 18 (S207). Further, the sheet location determining section 14c determines the sheet location by using the above-mentioned techniques and sets the information of the initial point (k, 0) and the terminal point (k, 1) of the current sheet location and saves them with being associated with pen position information obtained by handwriting information obtaining section 14b, in the storage section 18 (S208). Subsequently, the input detecting section 14a determines whether the handwriting input has been completed (for example, whether any handwriting input has not been detected for a predetermined period or termination of the handwriting input is instructed) (S209). If the handwriting input has not been completed, the processing returns to S205, and the similar processing is performed in the next sampling period.

If the handwriting input has been completed, control section 14 sequentially reads the pen position information and the information of the initial point and the terminal point of the sheet locations which were obtained at the predetermined sampling intervals and saved in the storage section 18 (S210), and the processing in each of S211 to 217 is performed on the basis of the pen position information and the information of the initial point and the terminal point of the sheet location obtained in each sampling time. In concrete terms, the displacement amount calculating section 14d calculates a displacement amount of the sheet on the basis of a change in the information of the initial point and the terminal point of the sheet location obtained in each sampling time (S211), and the handwriting information correcting section 14e corrects the pen position information obtained by handwriting information obtaining section 14b, on the basis of the displacement amounts of the sheet calculated by the displacement amount calculating section 14d (S212). Further, the handwriting information obtaining section 14b determines whether the sampling interval is sufficiently short (S213). If the sampling interval is sufficiently short, handwriting information obtaining section 14b sets the line segment flag to "straight line" (S214). On the other hand, if the sampling interval is not sufficiently short, the handwriting information obtaining section 14b determines on the basis of the pen position information about pen positions obtained in plural past sampling times whether the pen position information changes in a straight line or changes in a curve (S215). Then, if the pen position information changes in a straight line (Yes at S216), handwriting information obtaining section 14b sets the line segment flag to "straight line" (S214), and if the pen position information does not change in a straight line (No at S216), handwriting information obtaining section 14b sets the line segment flag to "curve" (S115).

Subsequently, handwriting information correcting section 14e saves the corrected handwriting information data (including line segment IDs, position information of pen 30, a pen event, time information about pen 30), corrected at S212, as needed, with being associated with the line segment flag set at S214 or S217. Further, handwriting information correcting section 14e transfers the handwriting information associated with the line segment flag to an external device (for example, processing device 20 in FIG. 5) (S218).

In the flowcharts illustrated in FIGS. 8A and 8B and FIGS. 9A and 9B, handwriting input device 10 is configured to correct handwriting information. Alternatively, the handwriting input device 10 may be configured to perform only obtaining handwriting information and sheet location information, and calculation of the displacement amounts of the sheet and correction of handwriting information may be performed by an external device (for example, processing device 20). Alternatively, the handwriting input device 10 may be configured to perform only obtaining handwriting information and sheet location information and calculation of the displacement amounts of the sheet, and correction of handwriting information may be performed by an external device (for example, processing device 20). Description is given to processing in such a case. CPU 15 loads the handwriting information obtaining program stored in ROM 16 or the storage section 18 onto RAM 17, and executes the program, thereby executing the processing in each step shown in a flowchart in FIGS. 10A and 10B.

When, a sheet of paper is set on touch panel 12 of handwriting input device 10 (S301), sheet location determining section 14c determines the location of the sheet on the basis of the pressure information and the position information of pressed points detected in the sheet holding region by input detecting section 14a, sets information of the initial point (0, 0) and the terminal point (0, 1) of the initial sheet location, saves them in the storage section 18, and transfers them to processing device 20 (S302).

Next, the input detecting section 14a determines whether a handwriting input has started (S303). When so handwriting input has started, displacement amount calculating section 14d determines whether the sheet is displaced (S304). If the sheet is not displaced, the processing returns to S303, and a start of a handwriting input is watched. On the other hand, if the sheet has been displaced, the processing returns to S302, and sheet location determining section 14c sets the information of initial point (0, 0) and the terminal point (0, 1) of the current sheet location.

If a handwriting input has started at S303, control section 14 determines whether a predetermined sampling interval has been reached (S305). If the sampling interval has been reached, sheet location determining section 14c determines the sheet location by using the above-mentioned techniques, sets information of the initial point (1, 0) and the terminal point (1, 1) of the current sheet location, and saves them with being associated with the current time, into the storage section 18 (S306). Further, handwriting information obtaining section 14b obtains the pen position information, and saves the information with being associated with the current time, in the storage section 18 (S307).

Next, as needed, handwriting information obtaining section 14b determines whether the sampling interval is sufficiently short (S308). If the sampling interval is sufficiently short, the line segment flag is set to "straight line" (S309). On the other hand, if the sampling interval is not sufficiently short, the handwriting information obtaining section 14b determines whether the pen position information changes in a straight line or changes in a curve on the basis of pen position information about pen positions obtained in plural past sampling times (S310). Then, if the pen position information changes in a straight line (Yes at S311), the handwriting information obtaining section 14b sets the line segment flag to "straight line" (S309), and if the pen position information does not change in a straight line (No at S311), the handwriting information obtaining section 14b sets the line segment flag to "curve" (S312).

Subsequently, the control section 14 transfers the saved information of the initial point (1, 0) and the terminal point (1, 1) of the sheet location and the saved pen position information (including line segment IDs, pen position information, a pen event, time information about the pen, and, if needed, the line segment flag) to processing device 20 so as to be associated with each other (S313). Then, the input detecting section 14a determines whether the handwriting input has been completed (for example, whether any handwriting input has not been detected for a predetermined period or termination of the handwriting input is instructed) (S314). If the handwriting input has not been completed, the processing returns to S305, and the similar processing is performed in the next sampling period. If the handwriting input has been completed, the processing returns to S303, and a start of a handwriting input is watched.

As another example, in the case that the handwriting input device 10 is configured to perform only obtaining handwriting information and sheet location information and calculation of the displacement amounts of the sheet, the following processing may be performed. After S307, displacement amount calculating section 14d may calculate the displacement amount of the sheet and save the displacement amount with being associated with the current time, in the storage section 18. Further, at S313, the control section 14 may transfer the saved displacement amount and the saved information of the initial point (1, 0) and the terminal point (1, 1) of the sheet location and the saved pen position information (including line segment IDs, pen position information, a pen event, time information about the pen, and, if needed, the line segment flag) to processing device 20 so as to be associated with each other.

Figure 11:
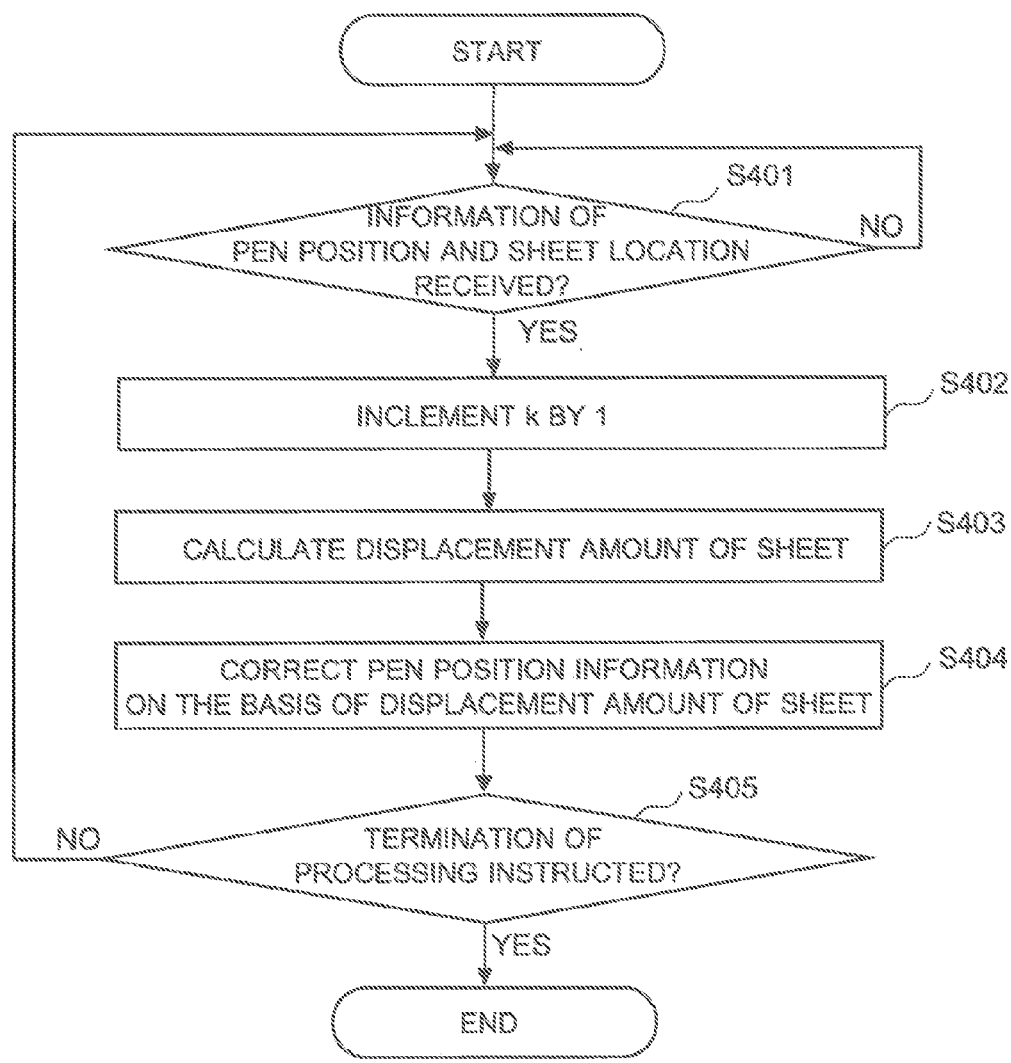
FIG. 11 is a flowchart illustrating an example of the processing of a processing device according to one embodiment of the present invention.
Figure 12:
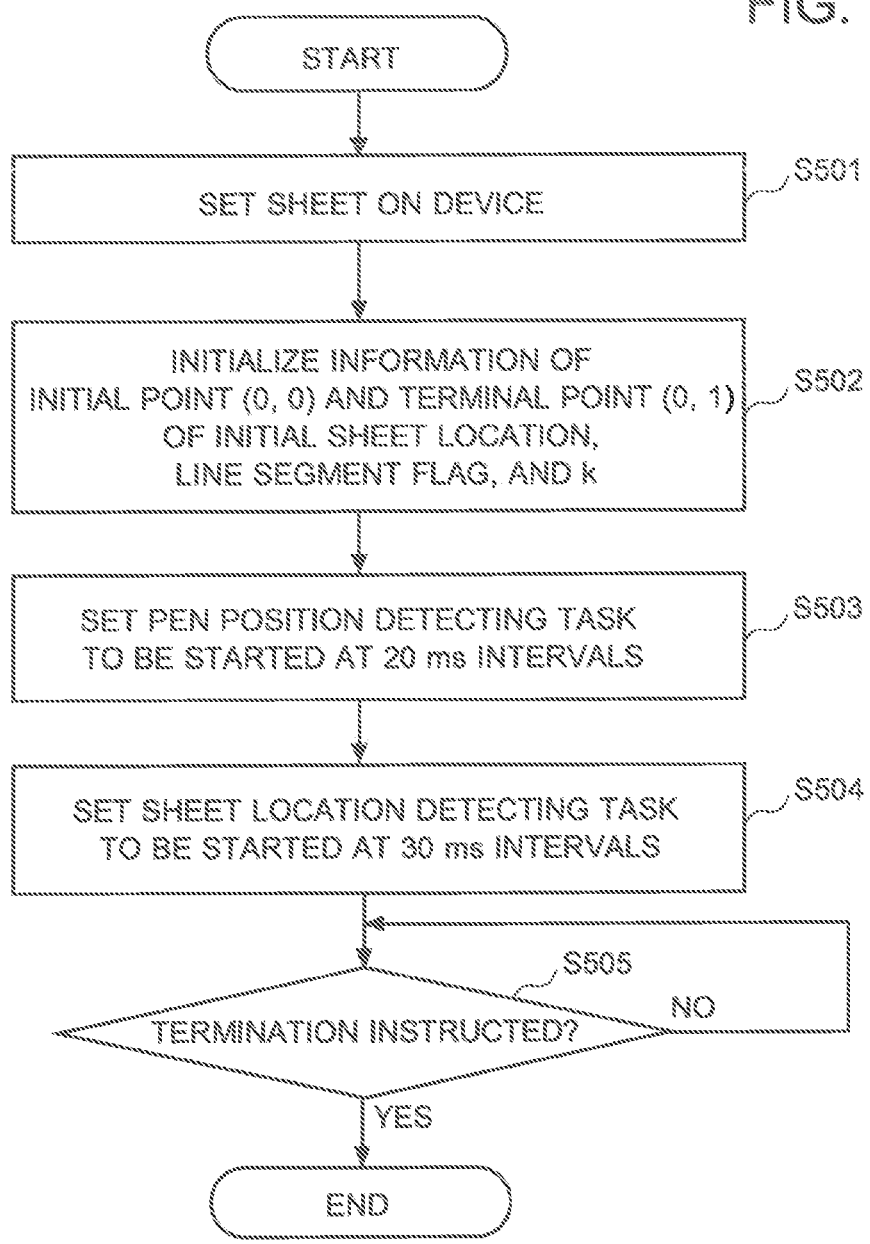
FIG. 12 is a flowchart illustrating an example of the processing (in the case of obtaining handwriting information and displacement information asynchronously) of the handwriting input device according to one embodiment of the present invention.

Next, description is given to the processing in processing device 20, CPU 22 loads the handwriting information obtaining program stored in ROM 23 or storage section 25 onto RAM 23, and executes the program, thereby executing the processing in each step shown in the flowchart in FIG. 11.

First, control section 21 of processing device 20 watches sheet location information and pen position information which are transmitted from handwriting input device 10 (S401), and upon receipt of position of sheet location information and pen position information, the control section 21 increments "k" by 1 (S402). Then, displacement amount calculating section 21a calculates a displacement amount of the sheet on the basis of a change in the information of the initial point and the terminal point of the sheet location (S403), and handwriting information correcting section 21b corrects the pen position information on the basis of the displacement amount of the sheet calculated by the displacement amount calculating section 21a (S404). At that time, as needed, the processing may be performed so as to reduce or thin out the pen. position information using a line segment flag. Subsequently, control section 21 watches an instruction for the termination of the processing (S405), and if the termination of the processing is not instructed, the processing returns to S401, and the similar processing is repeated.

As another example, in the case that the handwriting input device 10 is configured to perform only obtaining handwriting information and sheet location information and calculation of the displacement amounts of the sheet and the processing device 20 is configured to perform correction of handwriting information, the following processing may be performed. At S401, control section 21 of processing device 20 may receive a displacement amount of a sheet and pen position information, and then, at S404, handwriting information correcting section 21b may correct the pen position information on the basis of the received displacement amount of the sheet.

Figure 10A:
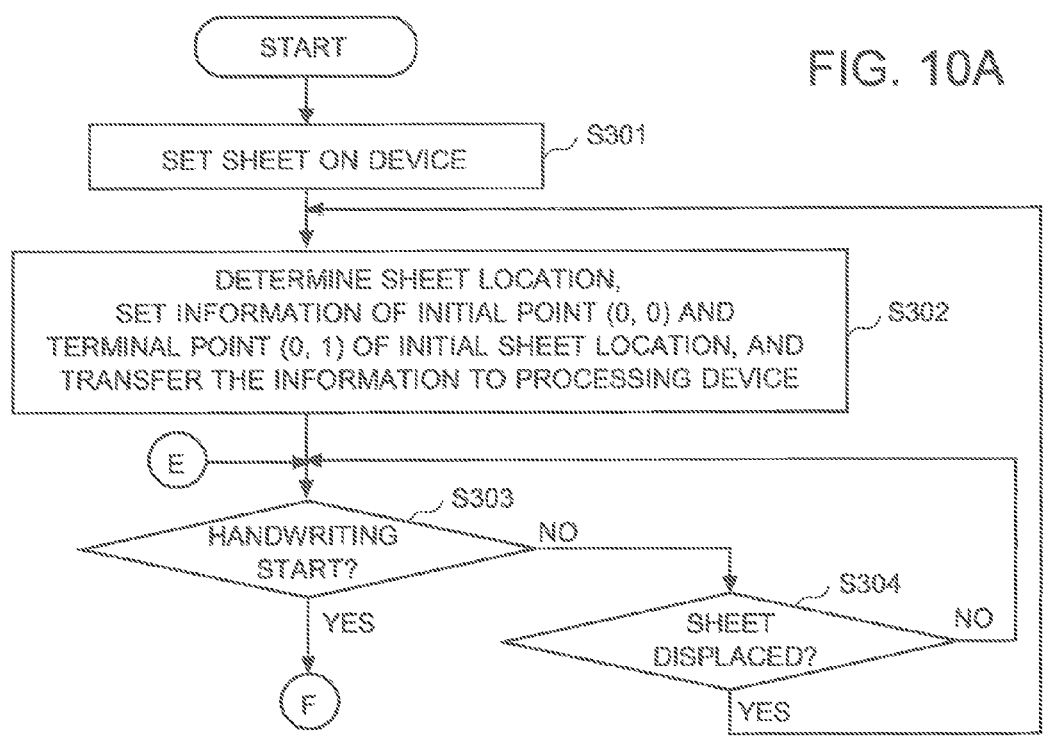
FIGS. 10A and 10B are a flowchart illustrating an example of the processing (in the case of outputting handwriting information and displacement information) of the handwriting input device according to one embodiment of the present invention.
Figure 10B:
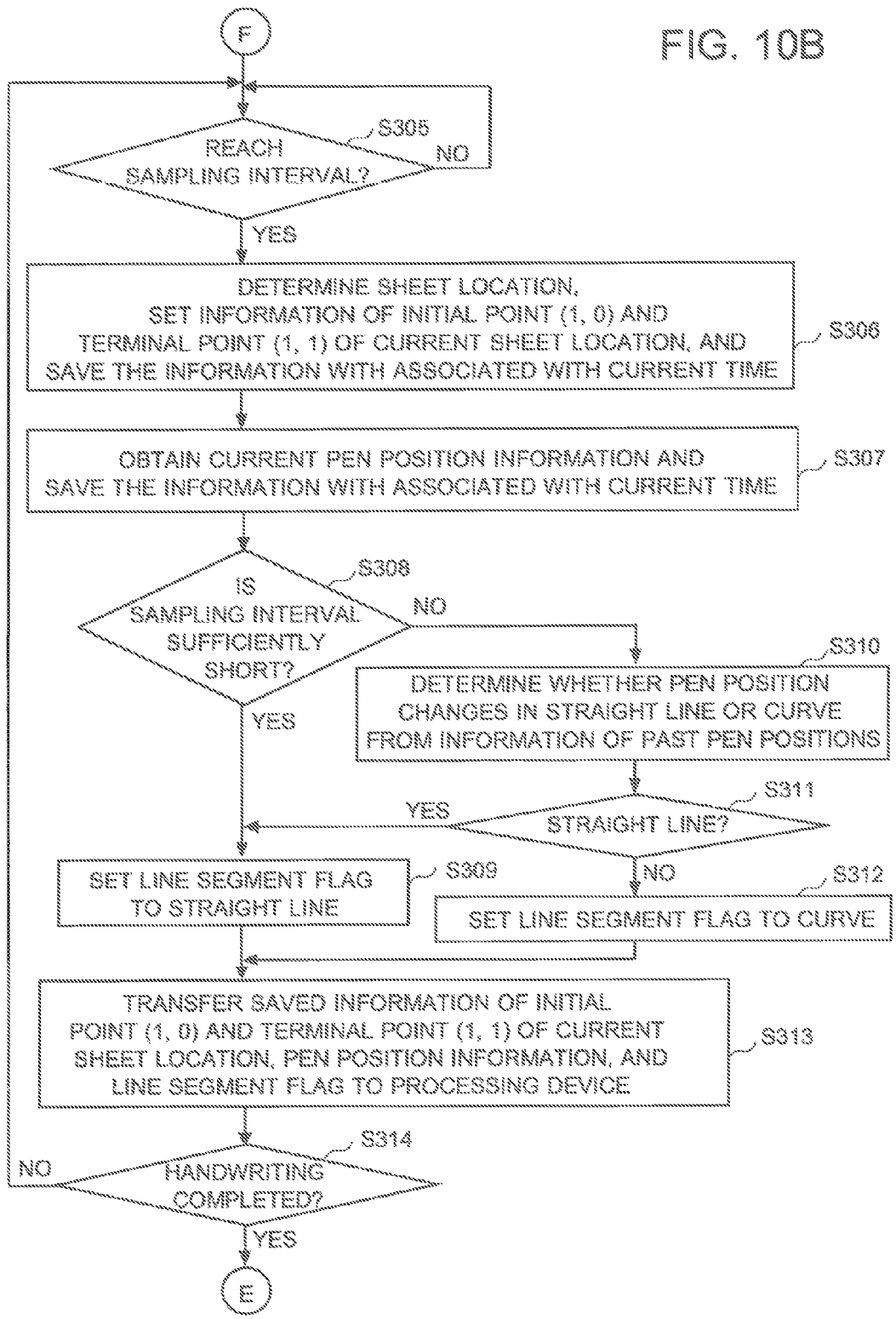

With respect to the processing in FIGS. 10A and 10B and FIG. 11, description is given based on a specific example. FIG. 19 is a graph illustrating an example of a locus of handwriting information, and the vertical axis and horizontal axis of the graph correspond to the X and Y coordinates on touch panel 12. FIG. 20 illustrates is an example of a table in which handwriting information (pen position information) and sheet location information obtained by handwriting input device 10 are described. The table of FIG. 20 shows, as handwriting information, data of the line segment ID (ID in the table), pen position information (X and Y coordinates), pen event, time information about the pen (Time in the table), and line segment flag (Line seg. flag in the table), and further shows, as sheet location information, data of the time information about the sheet location (Time in the table), and information of the initial point and terminal point of the sheet locations (Init. point and Term. point in the table).

For example, it is assumed that, as illustrated in FIG. 19, a user draws a straight line on a sheet on touch panel 12 by moving pen 30 from a top center position toward a lower right position in the figure (pen positions indicated by line segment ID=1 and black dots). Subsequently, the user moves the hand toward a lower left position (hand positions indicated, by line segment ID=0 and white cross marks), and further, draws a curve by moving pen 30 toward as upper position (pen positions indicated by line segment ID=2 and white triangle marks). At this time, as shown in the table of FIG. 20, handwriting input device 10 obtains a total of thirty-one (31) data sets of handwriting information and sheet location information, where the data sets include six data sets indicated by the line segment ID=1, seven data sets indicated by the line segment ID=0, and eighteen data sets indicated by the line segment ID=2. Handwriting input device 10 transfers the series of these data sets to processing device 20. Then, processing device 20 receives the series of data sets, calculates the displacement amounts of the sheet on the basis of the data of the sheet location information, and corrects the data of the pen position information on the basis of the displacement amounts of the sheet.

Here, if the sampling interval becomes shorter, an amount of data to be transferred to processing device 20 increases. It elongates processing time of calculating the displacement amounts of the sheet and processing time of correcting the data of pen position information. Then, in the present example, a line segment flag is employed to thin out omissible data of the handwriting information. Hereinafter, description is given to the technique.

First, description is given to a method of setting a line segment flag with reference to FIG. 21 to FIG. 29. Each of FIG. 21 to FIG. 29 illustrates an example of a way to set the line segment flag to "straight line" or "carve" for the data point of the pen position information of the current sampling time (referred to as an observed data point) in consideration of data points of the pen position information obtained in plural past sampling times (here, five data points; the this number of data points are referred to as a curve judging scope). In each figure, black dots indicate data points of pen position information obtained at certain sampling intervals when a user moves the pen from the left to the right in the figure.

Figure 21:
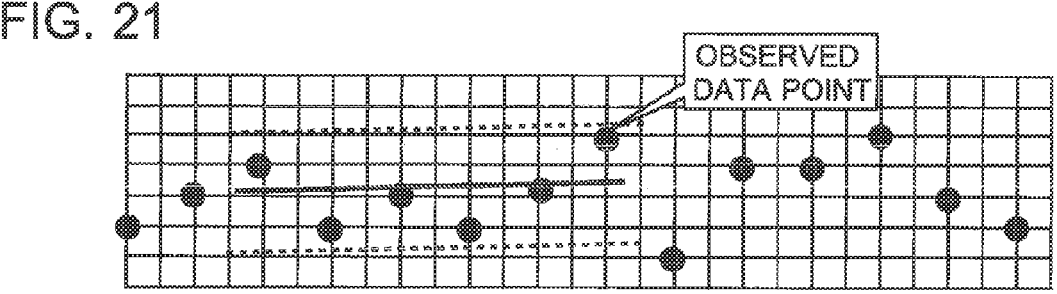
FIG. 21 is a schematic diagram for illustrating a method for setting a line segment flag for handwriting information according to one embodiment of the present invention.

For example, as illustrated in FIG. 21, in the case where the eighth data point of the pen position information from the left is defined an observed data point, handwriting information obtaining section 14b calculates the corresponding line segment (the sold line in FIG. 21) by using a least-squares method or the like with respect to six data points of pen position information which includes the observed data point and five data points of pen position information in the curve judging scope before the observed data point. Then, the handwriting information obtaining section 14b defines a predetermined range (which is a region sandwiched between two broken lines in FIG. 21, and referred to as a variation tolerance) for the calculated line segment, and confirms whether the six data points of the pen position information fall within the variation tolerance. In this case, the variation tolerance is set to two (corresponding to the number of grids in FIG. 21). Then, is the case where the six data points of the pen position information fall on or within the variation tolerance, the handwriting information obtaining section 14b judges that these data points can be approximated with a straight line, and sets the line segment flag of the observed data point to "straight line".

Figure 22:
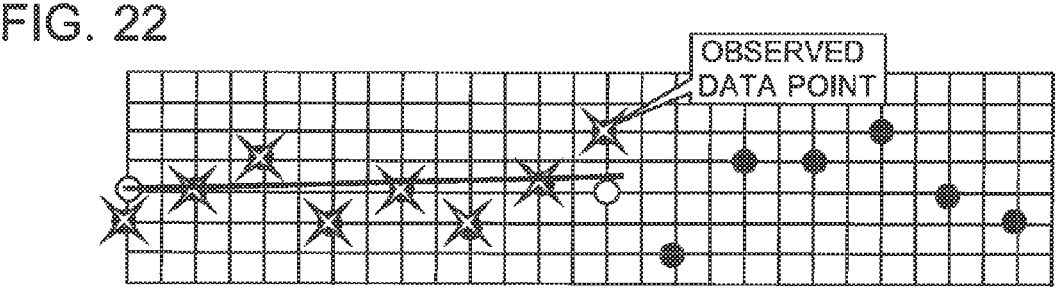
FIG. 22 is a schematic diagram for illustrating a method for setting a line segment flag for handwriting information according to one embodiment of the present invention.

Next, there is considered the case where the sixth and seventh data points of the pen position information from the left are defined as observed data points and the handwriting information obtaining section 14b also judges that these data points can be approximated with a straight line. In the case, as illustrated in FIG. 22, a group of data points (indicated with a white cross marks in FIG. 22) of pen position, information which are judged as being able to be approximated with a straight line, can be replaced with the data points at both ends (white circles in FIG. 22) if the sheet is not displaced within a period of time corresponding to the time information about the pen (that is, the series of data points can be reduced or thinned out).

Figure 23:
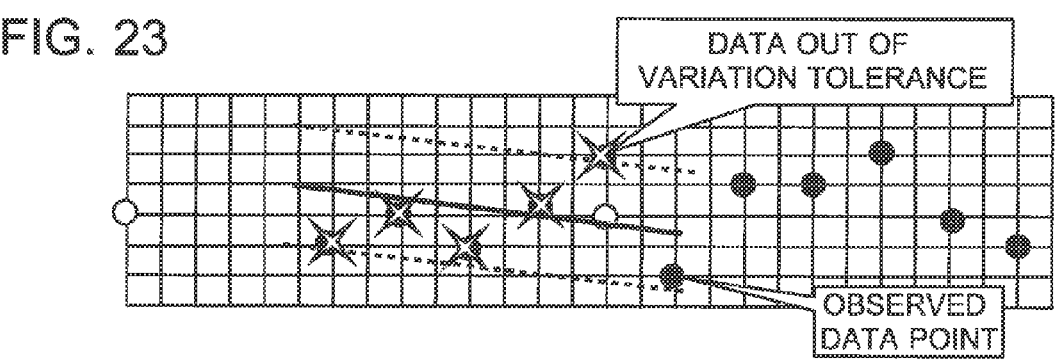
FIG. 23 is a schematic diagram for illustrating a method for setting a line segment flag for handwriting information according to one embodiment of the present invention.

Next, as illustrated in FIG. 23, the next data point of the pen position is defined to be an observed data, a line segment is calculated by using a least-squares method, or the like with respect to six data points of pen position information including the observed-data point and five data points of pen position information in the curve judging scope before the observed data point. Handwriting information obtaining section 14b defines a variation tolerance for the calculated line segment, and confirms whether the six data points of the pen position information fall within in the variation tolerance. In this example, since the data point of the pen position information located immediately before the observed data point falls out of the variation tolerance, this observed data point is judged as a part of a curve, and a ling segment flag of the observed data is set to "curve".

Figure 24:
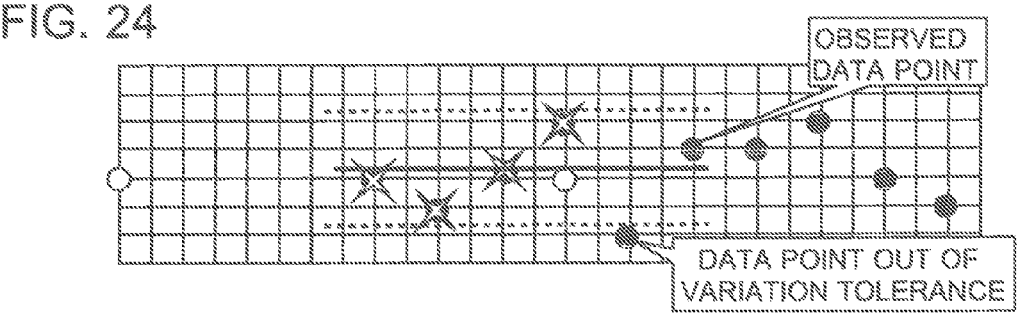
FIG. 24 is a schematic diagram for illustrating a method for setting a line segment flag for handwriting information according to one embodiment of the present invention.
Figure 25:
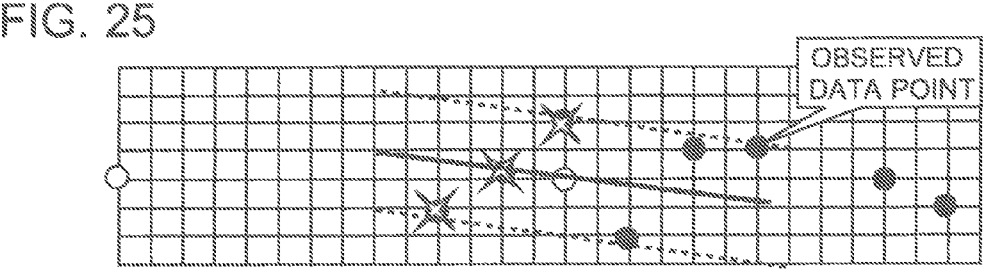
FIG. 25 is a schematic diagram for illustrating a method for setting a line segment flag for handwriting information according to one embodiment of the present invention.
Figure 26:
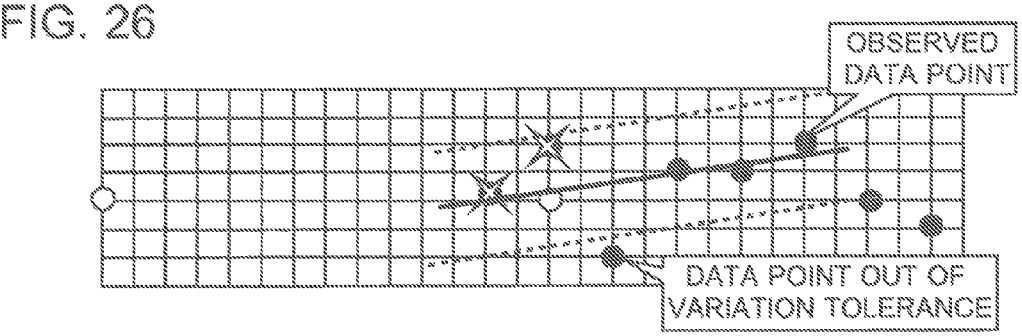
FIG. 26 is a schematic diagram for illustrating a method for setting a line segment flag for handwriting information according to one embodiment of the present invention.
Figure 27:
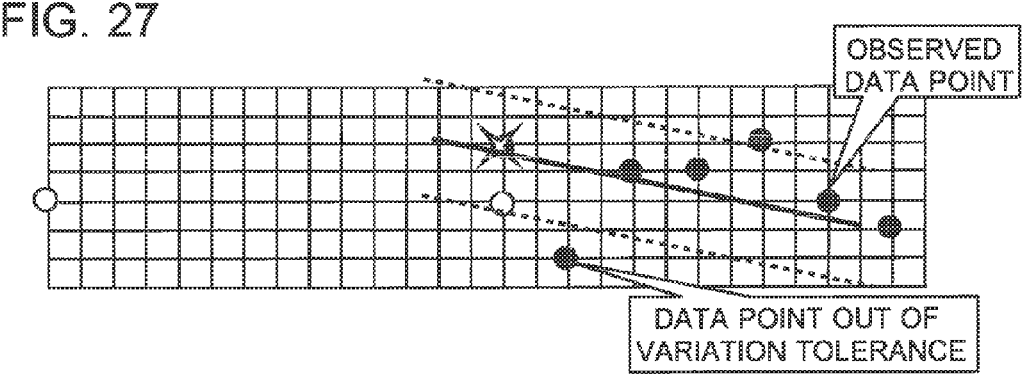
FIG. 27 is a schematic diagram for illustrating a method for setting a line segment flag for handwriting information according to one embodiment of the present invention.
Figure 28:
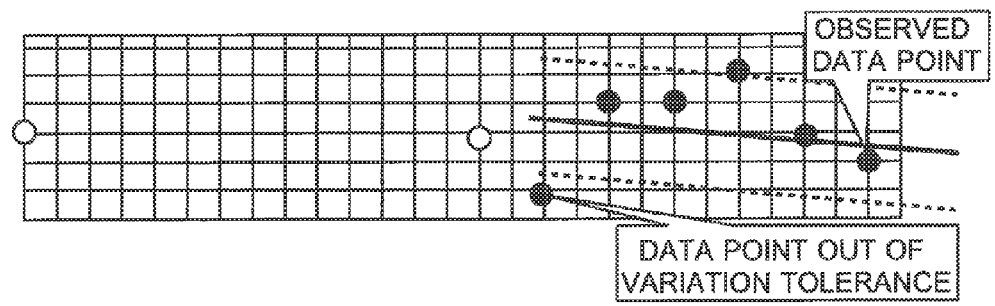
FIG. 28 is a schematic diagram for illustrating a method for setting a line segment flag for handwriting information according to one embodiment of the present invention.

Successively, the similar processing is repeated. In FIG. 24, since the data point of the pen position information located immediately before the observed data point falls out of the variation tolerance, this observed data point is judged as a part of a curve, and a ling segment flag of the observed data point is set to "curve". In FIG. 25, since all the data points of the pen position information data is the curve judging scope fall on or within the variation tolerance, these data points are judged as being able to be approximated with a straight line, and a ling segment flag of the observed data point is set to "straight line". In each of FIGS. 26 to 28, there is a data point of the pen position information which falls out of the variation tolerance. Accordingly, this observed data point is judged as a part of a curve, and a line segment flag of the observed data point is set to "curve".

Figure 29:
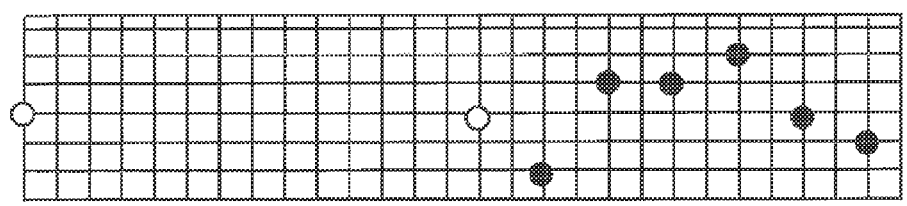
FIG. 29 is a schematic diagram for illustrating a method for setting a line segment flag for handwriting information according to one embodiment of the present invention.

In this way, a series of data points of the pen position information for each of which the line segment flag is set to "straight line" can be replaced with two data points of pen position information which sufficiently define the line segment. Accordingly, fourteen data points of the pen position information illustrated in FIG. 21 can be reduced to eight data points of the pen position information as illustrated in FIG. 29, whereby six data points of the pen position information can be eliminated. This matter is described with reference to the table in FIG. 20. In the table, with respect to the six data points of the handwriting information indicated by line segment ID=1, the line segment flag is set to "straight line" and the sheet location does not change. Accordingly, the four data points of the handwriting information located at the central portion of the six data points (data points of handwriting information indicated by "A" in FIG. 20) can be eliminated. Further, since seven data points of the handwriting information indicated by line segment ID=0 correspond to the movement of the user's hand, the seven data points of the handwriting information (data points of handwriting information indicated by "B" in FIG. 20) can be eliminated, too. Among the data points of handwriting information indicated by line segment ID=2, the line segment flag for the last five data points of the handwriting information data is "straight line", but the sheet location changes in the corresponding period of time. Therefore, these data points are not eliminated.

In the above examples, description is given to the case where data points of the handwriting information for which a line segment flag is set to "straight line" are eliminated. However, also in the case of data points for which a line segment flag is set to "curve", the data points can be fitted to a curve by using a least-squares method. Accordingly, in the case where multiple data points of the handwriting information for each of which a line segment flag is set to "curve" continue and a sheet location does not change during the corresponding period of time, a part of multiple data points of the handwriting information in the middle of them can be eliminated. For example, in the table in FIG. 20, among the data points of handwriting information indicated by line segment ID=2, a line segment flag of the first eight data points of the handwriting information is "curve" and a sheet location does not change during the corresponding period of time. Accordingly, the six data points of the handwriting information located at the central portion (data points of handwriting information indicated by "C" in FIG. 20) can be eliminated.

Description is given to the reduction effect of art amount of data by reducing or thinning out the data points of handwriting information with the above technique. In the case of the table in FIG. 20, six kinds of data of handwriting information are held as one data set for one sampling time. Accordingly, the total of data pieces in the table becomes 186 data pieces (31×6=186). On the other band, after a total of seventeen data points of handwriting information has been eliminated, where the seventeen data points includes four data points handwriting information indicated by line segment ID=1, seven data points of handwriting information indicated by line segment ID=0, and six data points of handwriting information indicated by line segment ID=2, the total of data pieces becomes 84 data pieces (14×6=84). Accordingly, an amount of data to be transferred to processing device 20 can be reduced, whereby the load of the correction processing for the data, of the pen position information can be reduced.

In the case of the processing type where data are transferred at each timing when a handwriting input starts, data point of handwriting information in which a pen event is set to "Pen Up" can be reduced and the data of the pen event can be reduced. Accordingly, the same processing can be performed with a small amount of data. Further, in the case of the processing type where data are transferred at each timing when a displacement of a sheet takes place, data pieces of sheet location information in which information of the initial point and the terminal point do not change can be reduced. Accordingly, the same processing can be performed with a small amount of data.

In the above examples, description is given to the case where the pen position information and the sheet location information are obtained with the same sampling period. However, the pen position, information and the sheet location information can be obtained asynchronously by setting the sampling interval for obtaining the pen position information and the sampling interval for obtaining the sheet location information to be different lengths. Then, description is given to the processing of the handwriting input device 10 in the case where the handwriting input device 10 obtains the pen position information, and sheet location information asynchronously by using different sampling intervals for obtaining the pen position information and for obtaining the sheet location information and to transfer them to processing device 20 and the processing device 20 performs calculation of displacement amounts of the sheet and corrects the handwriting information. The CPU 15 loads the handwriting information obtaining program stored in the ROM 16 or the storage section 18 onto the RAM 17, and executes it, thereby executing the processing in each step shown in the flowchart in each of FIG. 12 to FIG. 14.

When a sheet is set on the touch panel 12 of the handwriting input device 10 (S101), the control section 14 initializes information of the initial point (0, 0) and the terminal points (0, 1) of the sheet location, the line segment flag, and the value of k (S502). Next, the control section 14 sets a pen position detecting task so as to start at first sampling intervals (for example, 20 millisecond intervals) (S503), and sets a sheet location detecting task so as to start at second sampling intervals (for example, 30 millisecond intervals) (S504). Thereafter, the control section 14 waits until an instruction of termination is made (S505).

Figure 13:
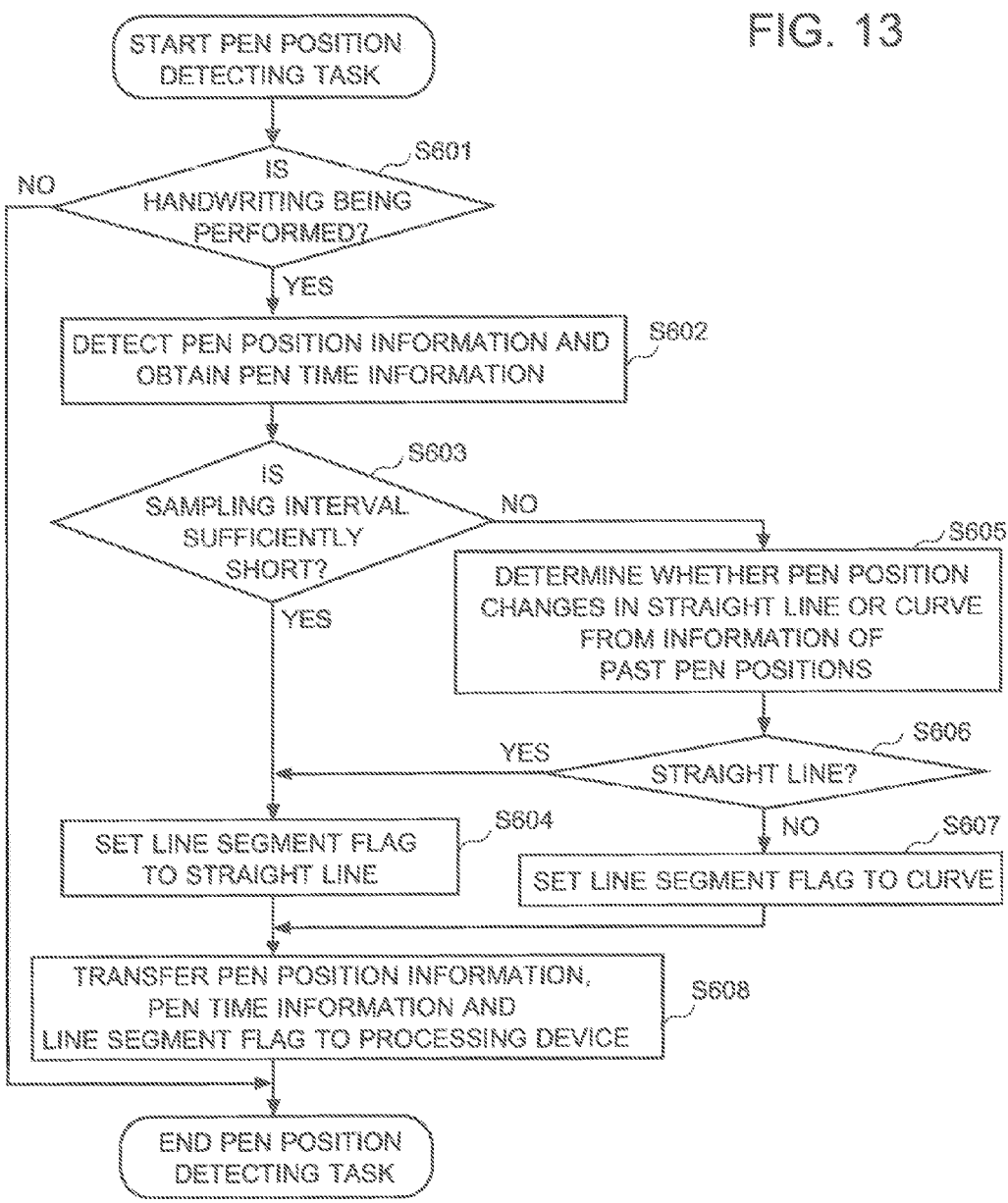
FIG. 13 is a flowchart illustrating an example of the processing (a pen position detecting task) of the handwriting input device according to one embodiment of the present invention.

FIG. 13 illustrates the details of the pen position detecting task, and the input detecting section 14a determines whether a handwriting input is being performed (S601). When a handwriting input is not performed, the processing is ended. When a handwriting input is being performed, the handwriting information obtaining section 14b detects the pen position information, and obtains the current time as pen time information (S602). Next, as needed, the handwriting information obtaining section 14b determines whether the sampling interval for obtaining the pen position information is sufficiently short (S603). When the sampling interval is sufficiently short, the handwriting information obtaining section 14b sets the line segment flag to "straight line" (S604). On the other hand, when the sampling interval is not sufficiently short, the handwriting information obtaining section. 14b determines whether the pen position information changes in a straight line or a curve based on the pen position information obtained in plural past sampling times (S605). Then, the pen position information changes in a straight line (Yes at S606), the handwriting information obtaining section 14b sets the line segment flag to "straight line" (S604), and when the pen position information does not change in a straight line (No at S606), the handwriting information obtaining section 14b sets the line segment flag to "curve" (S607). Successively, the handwriting information obtaining section 14b transfers the data of the pen position information and the pen time information, and as needed the line segment flag, to processing device 29 (S608).

Figure 14:
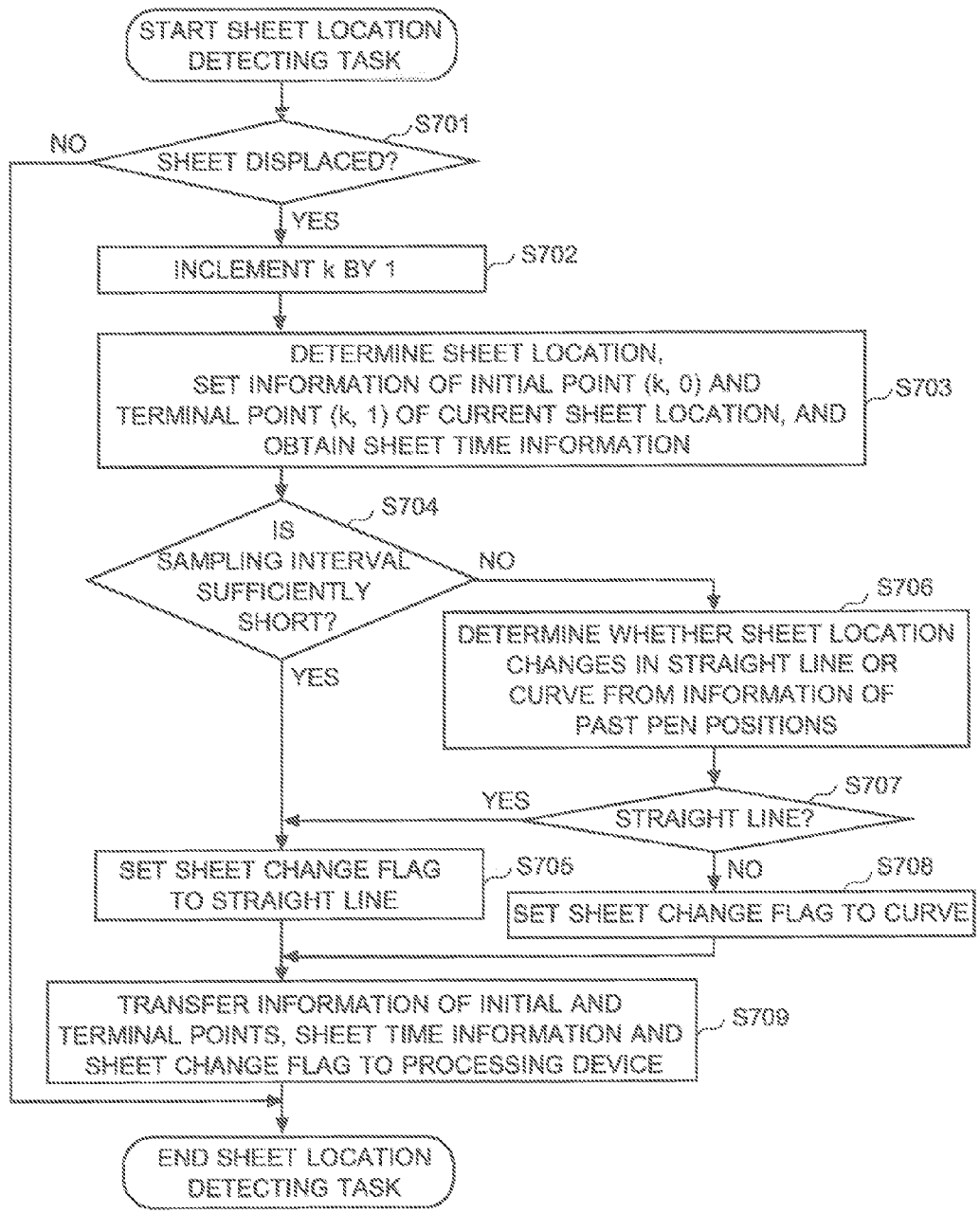
FIG. 14 is a flowchart illustrating an example of the processing (a sheet location detecting task) of the handwriting input device according to one embodiment of the present invention.

FIG. 14 illustrates the details of the sheet location detecting task, and the displacement amount calculating section 14d determines whether a sheet displacement exists based on the location of the sheet determined by the sheet location determining section 14c (S701). When a sheet displacement does not exist, the processing is ended. On the other hand, when a sheet displacement exists, the control section 14 increments "k" by 1 (S702), and the sheet location determining section 14c determines the sheet location by using the above-mentioned technique, sets information of the initial point (k, 0) and the terminal point (k, 1) of the current sheet location, and obtains the current time as sheet time information (S703). Next, as needed, the sheet location determining section 14c determines whether the sampling interval for obtaining position information of a sheet location is sufficiently short (S704). When the sampling interval is sufficiently short, a sheet change flag is set to "straight line" (S705). On the other hand, when the sampling interval is not sufficiently short, the sheet location determining section 14e determines whether the sheet location information changes in a straight line or a curve based on the position information of the sheet locations obtained in plural past sampling times (information of the initial point and the terminal point in the past sheet locations) (S706). Then, if the sheet location information changes in a straight line (Yes at S707), the sheet location determining section 14c sets the sheet change flag to "straight line" (S705); and if the sheet location information does not change in a straight line (No at S707), the sheet location determining section 14c sets the sheet change flag to "curve" (S708). Successively, the control section 14 transfers the information of the initial point (k, 0) and the terminal point (k, 1) of the current sheet location and the sheet time information, and as needed the sheet change flag, to processing device 20 (S709).

Figure 30A:
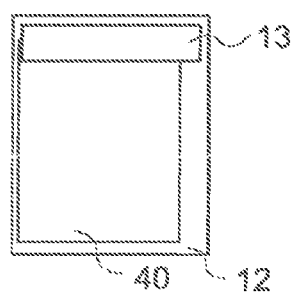
FIGS. 30A to 30D are schematic diagrams for illustrating displacement (parallel shift) of a sheet on the handwriting input device according to one embodiment of the present invention.
Figure 30B:
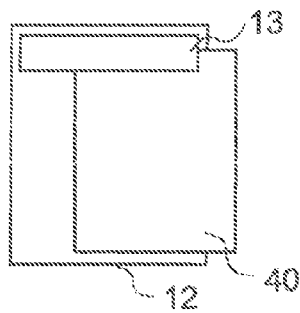
Figure 30C:
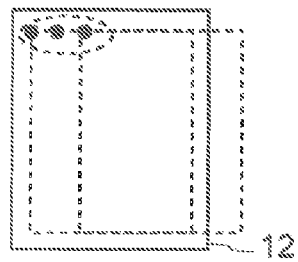
Figure 30D:

Here, the above sheet change flag can be set with the same technique as the line segment flag. For example, in the case where sheet 40 is held on touch panel 12 as illustrated in FIG. 30A and then, the location of sheet 40 is displaced (shifts in parallel) as illustrated in FIG. 30B, a specific part of the sheet 40 (in this case, the upper left corner of sheet 40) changes as illustrated with black dots in FIG. 30C. With respect to sheet location information obtained at plural past sampling times (three data points in this case), handwriting information obtaining section 14b calculates the corresponding line segment (the solid line in FIG. 30D) by using a least-squares method or the like, as illustrated in FIG. 30D. Then, the handwriting information obtaining section 14b defines a predetermined range (which is a variation tolerance, a region sandwiched between two broken lines in FIG. 30D) for the calculated line segment, and confirms whether the above three data points of the sheet location information fall within the variation tolerance. In this case, since the three data points of the sheet location information fall on or within the variation tolerance, the handwriting information obtaining section 14b judges that these data points can be approximated with a straight line, and sets the sheet change flag corresponding to the sheet location information is set to "straight line".

Figure 31A:
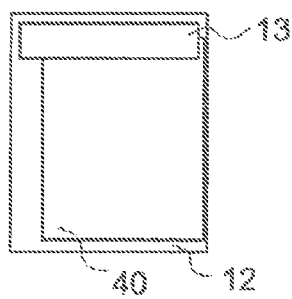
FIGS. 31A to 31E are schematic diagrams for illustrating displacement (turn) of a sheet on the handwriting input device according to one embodiment of the present invention.
Figure 31B:
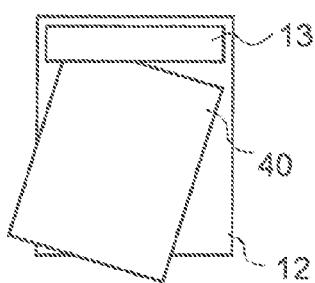
Figure 31C:
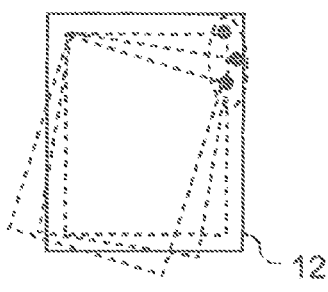
Figure 31D:
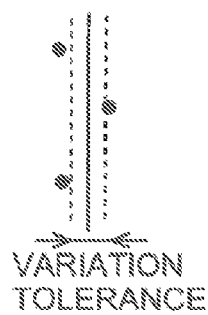
Figure 31E:

Further, in the case where sheet 40 is held on the touch panel 12 as illustrated in FIG. 31A and then the location of the sheet 40 is displaced (turns) as illustrated in FIG. 31B, a specific part of the sheet 40 (in this case, the upper right corner of sheet 40) changes as illustrated with black dots in FIG. 31C. With respect to sheet location information obtained at plural past sampling times (three data points in this case), handwriting information obtaining section 14b calculates the corresponding line segment (the solid line in FIGS. 31D and 31E) by using a least-squares method or the like as illustrated FIGS. 31D and 31E. Then, the handwriting information obtaining section 14b defines a variation, tolerance (broken lines in FIGS. 31D and 31E), and confirms whether the above three data points of the sheet location information fall on or within the variation tolerance. In the case of FIG. 31D, the three data points of the sheet location information fall out of the variation tolerance. In the case of FIG. 31E, the three data points of the position information of the sheet locations fall on or within the variation tolerance. Accordingly, handwriting information obtaining section 14b judges as a part of a curve, and sets the sheet change flag corresponding to the sheet location information to "curve".

FIGS. 32A to 32C show an example of a table obtained in the case where pen position information and sheet location information are obtained asynchronously. The table shows, as the handwriting information, data of the line segment ID (ID in the table), pen position information (X and Y coordinates), pen event, time information about the pen (Time in the table), and line segment flag (line seg. flag in the table), and further shows, as sheet location information, data of the sheet change flag in addition to the sheet time information and the information of the initial point and the terminal point of the sheet locations (last point and Term, point in the table). The table farther shows tags ("Start" in the table) indicating start timing of each of a pen position detecting task and a sheet location detecting task.

In this example, the pen position detecting task starts at 20 millisecond intervals and the sheet location detecting task starts at 30 millisecond intervals, that is, the interval, for starting the sheet location detecting task is longer than the interval for starting the pen position detecting task. Accordingly, sheet location information corresponding to the pen position information is found every 60 milliseconds (see the elapsed time in the table). For pen position information at the other elapsed times, corresponding sheet location information is not found. The pen position information for which corresponding sheet location information has been found, can be corrected based on the sheet displacement amount calculated from the corresponding sheet location information. However, the pen position, information for which corresponding sheet location information has not been found (for example, at the time when the elapsed time is (30+60×n) or (40+60×n), where n is a positive number including 0), the pen position information cannot be corrected without the following process. In such a situation, displacement amount calculating section 14d calculates sheet location information corresponding to the pen position information concerned based on sheet location information about a predetermined number of sheet locations obtained immediately before the pen position information concerned has been obtained, and the calculates the displacement amount of the sheet corresponding to the pen position information concerned. In concrete terms, the displacement amount calculating section 14d utilizes a sheet change flag, and for example, if the sheet change flag for the sheet location information about the predetermined, number of sheet locations is set to "straight line", the displacement amount calculating section 14d interpolates the predetermined number of sheet locations by a straight line, and calculates the sheet location information corresponding to the handwriting information concerned. Further, on the basis of the calculated sheet location information, the displacement amount calculating section 14d calculates the sheet displacement amount, and the handwriting information correcting section 14e corrects the pen position information based on the calculated sheet displacement amount.

Further, if the pen position, information corresponding to the sheet location information has not been found (for example, at the time when foe elapsed time is 30+60×n, where n is a positive number including 0), the handwriting information correcting section 14e utilizes a line segment flag, and for example, if line segment flag of sheet location information about a predetermined number of the sheet locations obtained immediately before the pen position information concerned is "straight line", the handwriting information correcting section 14e interpolates the predetermined number of sheet locations by a straight line, and calculates the pen position information corresponding to the sheet location information. Successively, the handwriting information correcting section 14e corrects the calculated pen position information based on the sheet displacement amount calculated from the sheet location information.

That is, even in the case where pen position information and sheet location information are obtained asynchronously, the pen position information and the sheet location information are complemented or interpolated by using a line segment flag or a sheet change flag, whereby handwriting information can be appropriately corrected. Accordingly, the sampling interval for obtaining sheet location information can be prolonged relatively, and the number of times of processing in each of the sheet location determining section 14c and the displacement amount calculating section 14d can be reduced, whereby the load on the control section 14 can be reduced.

Further, the pen position information for which a line segment flag is set to "straight line" and the sheet location information does not change, can be reduced or thinned out by using the above-described technique.

As described above, by obtaining pen position information and sheet location information at respective sampling intervals, calculating a displacement amount of a sheet on the basis of a change in the sheet location information, and correcting the pen position information on the basis of the calculated displacement amount of the sheet, handwriting information as written by band on the sheet can be obtained even if the sheet is displaced doe to pen pressure or a touch of a user's hand during the handwriting input.

Here, the present invention should not be limited to the above examples, and the constitution of the handwriting input device and the method of obtaining handwriting information can be modified appropriately unless such modification deviates from the intention of the present invention.

For example, in the above examples, the thin-out processing for handwriting information and sheet location information and the complementation processing for the handwriting information and the sheet location information are performed by processing device 20. However, the thin-out processing and the complementation processing may be performed by handwriting input device 10.

Further, in the above examples, description is given to the handwriting input device 10 equipped with the touch panel 12 of a pressure sensitive type. The touch panel 12 may be also an electromagnetic induction type or a magnetic detection type. In such a case, the pressed position in the above descriptions correspond to a touch position on such a touch panel 12. Furthermore, in the above examples, the touch panel 12 is configured to allow a user to only operations thereon. However, the touch panel 12 may be integrated with a display section, such as, a LCD (Liquid Crystal Display), so as to allow a user to check handwriting information for which a sheet displacement was corrected, on handwriting input device 10 itself.

The present invention can be utilized for a handwriting input device which includes a sensor disposed beneath a sheet, and which detects a movement of a pen with the sensor and converts the detected information into electric data, in response to receiving a handwriting input made on a sheet with a pen; a method of obtaining handwriting information in the handwriting input device or a processing device; a handwriting information obtaining program, and a non-transitory computer-readable storage medium storing the handwriting information obtaining program.

Although embodiments and examples of the present invention has been described and illustrated in detail, it is clearly understood that the same is by way of illustrated and example only and is not to be taken by way of limitation, the scope of the present invention being interpreted by terms of the appended claims.

The invention claimed is:

1. A handwriting input device comprising:
a touch panel which can detect a touch given through a sheet of paper put on the touch panel; and a control section, which obtains position information of touch points on the touch panel at first time intervals, determines a location of a sheet of paper on the touch panel to obtain position information of a specific part of the sheet as sheet location information, at second time intervals, and outputs the position information of the touch points and the sheet location information so as to be associated with each other, wherein the second time interval is longer than the first time interval, and the control section, on finding no sheet location information which corresponds to the position information of one of the touch points, calculates corresponding sheet location information which corresponds to the position information of the one of the touch points, on a basis of the sheet location information about a predetermined number of locations of the sheet obtained immediately before obtaining the position information of the one of the touch points, and calculates a displacement amount of the sheet corresponding to the position information of the one of the touch points, by using the calculated corresponding sheet location information.

2. The handwriting input device of claim 1, wherein the control section, on finding the sheet location information which corresponds to the position information of one of the touch points, calculates displacement amounts of the sheet corresponding to the position information of the respective touch points on the touch panel, on a basis of a change of the sheet location information, and outputs the position information of the touch points and the displacement amounts of the sheet so as to be associated with each other.

3. The handwriting input device of claim 2, wherein the control section calculates the displacement amounts of the sheet with respect to a predetermined reference position.

4. The handwriting input device of claim 2, wherein the control section corrects the position information of the touch points corresponding to the respective displacement amounts of the sheet on a basis of the displacement amounts of the sheet.

5. The handwriting input device of claim 4, wherein the control section corrects the position information of the touch point, in response to finding a displacement of the sheet.

6. The handwriting input device of claim 4, wherein the control section, each time when obtaining position information of a touch point on the touch panel, corrects the position information of the touch point.

7. The handwriting input device of claim 4, wherein the control section, after obtaining a piece of handwriting information including position information of a series of touch points on the touch panel, corrects the position information of the series of touch points.

8. A handwriting input device comprising:
a touch panel which can detect a touch given through a sheet of paper put on the touch panel; and
a control section, which obtains position information of touch points on the touch panel at first time intervals, determines a location of a sheet of paper on the touch panel to obtain position information of a specific part of the sheet as sheet location information, at second time intervals, and outputs the position information of the touch points and the sheet location information so as to be associated with each other,
wherein the control section determines the location of the sheet at the second time intervals during a time period when the control section obtains the position information of the touch point on the touch panel at the first time intervals.

9. A method for obtaining handwriting information in a system including a handwriting input device including a touch panel which can detect a touch given through a sheet of paper put on the touch panel, the method comprising:
obtaining position information of touch points on the touch panel at first time intervals;
determining a location of a sheet of paper on the touch panel to obtain position information of a specific part of the sheet as sheet location information, at second time intervals; and
outputting the position information of the touch points and the sheet location information so as to be associated with each other,
wherein the second time interval is longer than the first time interval, and calculating displacement amounts of the sheet corresponding to the position information of the respective touch points includes, on finding no sheet location information which corresponds to the position information of one of the touch points, calculating corresponding sheet location information which corresponds to the position information of the one of the touch points, on a basis of the sheet location information about a predetermined number of locations of the sheet obtained immediately before obtaining the position information of the one of the touch points, and calculating a displacement amount of the sheet corresponding to the position information of the one of the touch points, by using the calculated corresponding sheet location information.

10. The method of claim 9, further comprising, on finding the sheet location information which corresponds to the position information of one of the touch points, calculating displacement amounts of the sheet corresponding to the position information of the respective touch points on the touch panel, on a basis of a change of the sheet location information, wherein the outputting the position information of the touch points and the sheet location information includes outputting the position information of the touch points and the displacement amounts of the sheet so as to be associated with each other.

11. The method of claim 10, wherein the calculating the displacement amounts includes calculating the displacement amounts of the sheet with respect to a predetermined reference position.

12. The method of claim 10, further comprising correcting the position information of the touch points corresponding to the respective displacement amounts of the sheet, on a basis of the displacement amounts of the sheet.

13. The method of claim 12, wherein the correcting the position information of the touch points includes correcting the position information of the touch point, in response to finding a displacement of the sheet.

14. The method of claim 12, wherein the correcting the position information of the touch positions includes, each time when obtaining position information of a touch point on the touch panel, correcting the position information of the touch point.

15. The method of claim 12, wherein the correcting the position information of the touch positions includes, after obtaining a piece of handwriting information including position information of a series of touch points on the touch panel, correcting the position information of the series of touch points.

16. A method for obtaining handwriting information in a system including a handwriting input device including a touch panel which can detect a touch given through a sheet of paper put on the touch panel, the method comprising:

obtaining position information of touch points on the touch panel at first time intervals;

determining a location of a sheet of paper on the touch panel to obtain position information of a specific part of the sheet as sheet location information, at second time intervals; and outputting the position information of the touch points and the sheet location information so as to be associated with each other, wherein the determining the location of the sheet includes determining the location of the sheet at the second time intervals during a time period when obtaining the position information of the touch point on the touch panel at the first time intervals.

17. A non-transitory computer-readable storage medium storing a handwriting information obtaining program to be executed in a handwriting input device including a touch panel which can detect a touch given through a sheet of paper put on the touch panel, the handwriting information obtaining program, when being executed by a processor of the handwriting input device, causing the handwriting input device to perform processing comprising:

obtaining position information of a touch point on the touch panel at first time intervals;

determining a location of a sheet of paper on the touch panel to obtain position information of a specific part of the sheet as sheet location information, at second time intervals; and outputting the position information of the touch points and the sheet location information so as to be associated with each other, wherein the second time interval is longer than the first time interval, and the calculating the displacement amounts includes, on finding no sheet location information which corresponds to the position information of one of the touch points, calculating corresponding sheet location information which corresponds to the position information of the one of the touch points, on a basis of the sheet location information about a predetermined number of locations of the sheet obtained immediately before obtaining the position information of the one of the touch points, and calculating a displacement amount of the sheet corresponding to the position information of the one of the touch points, by using the calculated corresponding sheet location information.

18. The non-transitory computer-readable storage medium of claim 17, wherein the processing further comprises calculating displacement amounts of the sheet corresponding to the position information of the respective touch points on the touch panel, on a basis of a change of the sheet location information, wherein the outputting the position information of the touch points and the sheet location information includes outputting the position information of the touch points and the displacement amounts of the sheet so as to be associated with each other.

19. The non-transitory computer-readable storage medium of claim 18, wherein the processing further comprises correcting the position information of the touch points corresponding to the respective displacement amounts of the sheet, on a basis of the displacement amounts of the sheet.

* * * * *